United States Patent
Lee et al.

(10) Patent No.: US 10,670,901 B2
(45) Date of Patent: Jun. 2, 2020

(54) DISPLAY APPARATUS AND METHOD OF MANUFACTURING THE SAME

(71) Applicant: Samsung Display Co., Ltd., Yongin-si, Gyeonggi-do (KR)

(72) Inventors: Boram Lee, Seongnam-si (KR); Taimei Kodaira, Hwaseong-si (KR); Sangji Park, Seoul (KR); Kwangsoo Bae, Yongin-si (KR); Haeju Yun, Hwaseong-si (KR); Donchan Cho, Seongnam-si (KR); Youngje Cho, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 15/997,152

(22) Filed: Jun. 4, 2018

(65) Prior Publication Data
US 2019/0155106 A1    May 23, 2019

(30) Foreign Application Priority Data
Nov. 17, 2017   (KR) .................. 10-2017-0154314

(51) Int. Cl.
*G02F 1/1333*    (2006.01)
*G02F 1/1335*    (2006.01)
(Continued)

(52) U.S. Cl.
CPC ...... *G02F 1/133345* (2013.01); *G02F 1/1368* (2013.01); *G02F 1/133512* (2013.01);
(Continued)

(58) Field of Classification Search
CPC ......... G02F 1/133617; G02F 1/133512; G02F 1/1368; G02F 1/133621; G02F 1/133528;
(Continued)

(56) References Cited

U.S. PATENT DOCUMENTS 5,879,586 A * 3/1999 Kitamura ........... C09K 11/7734
                                                    252/301.4 R
6,888,593 B1 * 5/2005 Nakamura .............. G02B 1/111
                                                         349/137
(Continued)

FOREIGN PATENT DOCUMENTS

JP        3859399 B2    9/2006
JP        5371950 B2    9/2013
(Continued)

OTHER PUBLICATIONS

Hanemann, Thomas et al., "Polymer-Nanoparticle Composites: From Synthesis to Modern Applications," *Materials* 2010, vol. 3, pp. 3468-3517.

*Primary Examiner* — Shan Liu
(74) *Attorney, Agent, or Firm* — Lewis Roca Rothgerber Christie LLP

(57) ABSTRACT

A display apparatus includes a first base substrate, a partitioning wall pattern disposed between a first pixel area and a second pixel area and on the first base substrate, a first color conversion pattern disposed in the first pixel area and including quantum dot particles and/or phosphor, a first fluorine layer disposed on the first color conversion layer, fluorine content of the first fluorine layer being higher than that of the first color conversion pattern, and a second color conversion pattern disposed in the second pixel area and including quantum dot particles and/or phosphor.

20 Claims, 30 Drawing Sheets

(51) Int. Cl.
*G02F 1/1368* (2006.01)
*G09G 3/36* (2006.01)
*G02F 1/13357* (2006.01)

(52) U.S. Cl.
CPC .. *G02F 1/133514* (2013.01); *G02F 1/133528* (2013.01); *G02F 1/133617* (2013.01); *G02F 1/133621* (2013.01); *G02F 2001/133548* (2013.01); *G02F 2001/133614* (2013.01); *G02F 2202/36* (2013.01); *G09G 3/3607* (2013.01); *G09G 3/3648* (2013.01); *G09G 3/3677* (2013.01); *G09G 3/3688* (2013.01); *G09G 2300/0452* (2013.01); *G09G 2310/08* (2013.01); *G09G 2320/0673* (2013.01)

(58) Field of Classification Search
CPC ......... G02F 1/133345; G02F 1/133514; G02F 2001/133548; G02F 2001/133614; G02F 2202/36; G02F 1/133603; G02F 2201/44; G02F 1/116; G02F 1/133509; G02F 1/216; G02F 2001/133521; G02F 1/136209; G02F 1/13473; G02F 1/133371; G02F 2001/136222; G02F 2001/136218; G09G 3/3677; G09G 3/3688; G09G 2310/08; G09G 2320/0673; G09G 3/3607; G09G 3/3648; G09G 2300/0452; G02B 5/0294; G02B 6/3532; G03G 15/0435; H01J 9/205; H01J 11/44; H01J 2211/444; H01J 2329/323; H01J 29/327

USPC ...................... 349/69–71, 104–111
See application file for complete search history.

(56) References Cited

U.S. PATENT DOCUMENTS

| | | | |
|---|---|---|---|
| 2008/0036367 A1* | 2/2008 | Eida | H01L 27/322 313/504 |
| 2012/0228550 A1* | 9/2012 | Won | C09K 11/0883 252/301.4 H |
| 2012/0293748 A1* | 11/2012 | Jung | G02F 1/133528 349/69 |
| 2013/0208337 A1 | 8/2013 | Lee et al. | |
| 2014/0368766 A1* | 12/2014 | Shibata | G02B 5/201 349/61 |
| 2015/0042933 A1* | 2/2015 | Ueki | G02B 5/0242 349/108 |
| 2015/0323711 A1* | 11/2015 | Bessho | G02B 5/0242 349/71 |
| 2017/0102486 A1* | 4/2017 | Liu | G02B 5/305 |
| 2017/0250320 A1* | 8/2017 | Wakui | C09K 11/0883 |
| 2018/0031911 A1* | 2/2018 | Liu | G02F 1/133514 |
| 2019/0066545 A1* | 2/2019 | Jung | G09F 9/301 |

FOREIGN PATENT DOCUMENTS

| KR | 10-2013-0091933 A | 8/2013 |
|---|---|---|
| WO | WO 2006/129800 A1 | 12/2006 |

\* cited by examiner

DISPLAY APPARATUS AND METHOD OF MANUFACTURING THE SAME

CROSS-REFERENCE TO RELATED APPLICATION

This application claims priority to and the benefit of Korean Patent Application No. 10-2017-0154314, filed on Nov. 17, 2017, the disclosure of which is incorporated by reference herein in its entirety.

BACKGROUND

1. Field

Example embodiments of the inventive concept relate to a display apparatus and a method of manufacturing the display apparatus. More particularly, example embodiments of the inventive concept relate to a display apparatus having a color conversion layer using a photoluminescence and a method of manufacturing the display apparatus.

2. Description of the Related Art

Recently, a display apparatus, which is light in weight and small in size, has been manufactured. A cathode ray tube (CRT) display apparatus has been used due to its performance and competitive price. However, the comparative CRT display apparatus is large in size and has difficulties with its portability. Therefore, a display apparatus (such as a plasma display apparatus, a liquid crystal display apparatus and/or an organic light emitting display apparatus) has been highly regarded due to its small size, light weight, and low-power-consumption.

The display apparatus may further include a color conversion layer using photoluminescence. The color conversion layer may include a color conversion structure for converting color of light such as a quantum dot. A desired color can be imparted to an image by the color conversion layer. Thus, color reproducibility of the image and the luminous efficiency can be improved, so that the display quality can be improved. However, the above-mentioned display apparatus having the color conversion layer has a problem in that it is complex in structure, complex in the manufacturing process, and high in manufacturing cost.

Particularly, in order to reduce the costs, if an ink jet process is used for the display apparatus manufacturing process, a partitioning wall having a width equal to or larger than a certain size is required in order to prevent inkjet solution from leaking into neighboring pixels. As such, it has been difficult to improve the quality of the display apparatus because an aperture ratio is limited by the partition wall.

SUMMARY

One or more example aspects of the inventive concept provides a display apparatus capable of improving aperture ratio and capable of manufacturing using an inkjet process.

One or more example aspects of the inventive concept also provide a method of manufacturing the display apparatus.

According to an example embodiment of the inventive concept, a display apparatus includes a first base substrate, a partitioning wall pattern disposed between a first pixel area and a second pixel area and on the first base substrate, a first color conversion pattern disposed in the first pixel area and including quantum dot particles and/or phosphor, a first fluorine layer disposed on the first color conversion layer, fluorine content of the first fluorine layer being higher than that of the first color conversion pattern, and a second color conversion pattern disposed in the second pixel area and including quantum dot particles and/or phosphor.

In an example embodiment, the display apparatus may further include a hydrophobic layer formed on the partitioning wall pattern.

In an example embodiment, an upper surface of the first fluorine layer may be higher than an upper surface of the hydrophobic layer from the first base substrate. The upper surface of the first fluorine layer may be a surface of the first fluorine layer which is facing away (e.g., furthest) from the first base substrate. The upper surface of the hydrophobic layer may be a surface of the hydrophobic layer which is facing away (e.g., furthest) from the first base substrate.

In an example embodiment, the display apparatus may further include a light blocking pattern overlapping with the partitioning wall pattern and including a light blocking material.

In an example embodiment, the display apparatus may further include a second fluorine layer disposed on the second color conversion layer, fluorine content of the second fluorine layer being higher than that of the second color conversion pattern. Refractive index of the first fluorine layer may be lower than that of the first color conversion pattern. Refractive index of the second fluorine layer may be lower than that of the second color conversion pattern.

In an example embodiment, the display apparatus may further include a transparent layer disposed in the first pixel area, the second pixel area and a third pixel area which is spaced apart from the first and second pixel areas to cover the first fluorine layer and the second fluorine layer, a second base substrate facing the first base substrate, a thin film transistor disposed on the second base substrate, a liquid crystal layer disposed between the first base substrate and the second base substrate, and a backlight unit emitting a blue light. The first color conversion pattern may include red quantum dot particles and/or red phosphor, and the second color conversion pattern may include green quantum dot particles and/or green phosphor.

In an example embodiment, the display apparatus may further include a wire grid polarizer disposed on the transparent layer, and an insulation layer disposed on the wire grid polarizer.

In an example embodiment, the display apparatus may further include a first color filter disposed between the first color conversion pattern and the first base substrate, and a second color filter disposed between the second color conversion pattern and the first base substrate.

In an example embodiment, the first color conversion pattern may further include epoxy and/or epoxy-acrylate. The first fluorine layer may include fluorine and/or fluoropolymer.

In an example embodiment, the first color conversion pattern and the first fluorine layer may be formed in one layer whose boundary is unclear. This one layer may have a first portion which is close to the first base substrate and a second portion which is far from the first base substrate. A content of fluorine and/or fluoropolymer in the second portion may be larger than that in the first portion.

According to an example embodiment of the inventive concept, a method of manufacturing a display apparatus includes forming a partitioning wall pattern on a first base substrate between a first pixel area and a second pixel area, providing a first color conversion inkjet solution including a solvent and a fluorine surfactant, forming a first color conversion pattern and a first fluorine layer on the first color conversion pattern by curing the first color conversion inkjet solution, providing a second color conversion inkjet solution in the second pixel area on the first substrate on which the first fluorine layer is formed, and forming a second color conversion pattern by curing the second color conversion inkjet solution.

In an example embodiment, the first color conversion pattern may further include red quantum dot particles and/or red phosphor, and epoxy and/or epoxy-acrylate. The second color conversion pattern may further include green quantum dot particles and/or green phosphor.

In an example embodiment, the method may further include forming a hydrophobic layer on the partitioning wall pattern before providing the first color conversion inkjet solution.

In an example embodiment, the first fluorine layer may be formed to have a convex shape on its upper surface with a height higher than an upper surface of the hydrophobic layer from the first base substrate.

In an example embodiment, the method may further include forming a light blocking pattern on the first base substrate, or the partitioning wall pattern may include a light blocking material.

In an example embodiment, the method may further include forming a first color filter by an inkjet method in the first pixel area and forming a second color filter in the second pixel area before providing the first color conversion inkjet solution.

In an example embodiment, in providing the second color conversion inkjet solution, the second color conversion inkjet solution may include a solvent and a fluorine surfactant. In forming the second color conversion pattern, the second color conversion pattern and a second fluorine layer on the second color conversion pattern may be formed by curing the second color conversion inkjet solution. Refractive index of the first fluorine layer may be lower than that of the first color conversion pattern. Refractive index of the second fluorine layer may be lower than that of the second color conversion pattern.

In an example embodiment, forming the partitioning wall pattern may include forming a partitioning wall layer on the first base substrate, forming a preliminary hydrophobic layer on the partitioning wall layer, and forming the partitioning wall pattern and a hydrophobic layer on the partitioning wall pattern by patterning the preliminary hydrophobic layer and the partitioning wall layer.

In an example embodiment, the method may further include forming a blue light blocking pattern on the first base substrate in the first pixel area and the second pixel area before providing the first color conversion inkjet solution.

In an example embodiment, the first color conversion pattern and the first fluorine layer may be formed in one layer whose boundary is unclear. The one layer may have a first portion which is close to the first base substrate and a second portion which is far from the first base substrate. A content of fluorine and/or fluoropolymer in the second portion may be larger than that in the first portion.

According to the present inventive concept, a display apparatus include a first base substrate, a partitioning wall pattern, a first color conversion pattern, a first fluorine layer on the first color conversion pattern, and a second fluorine layer on the second color conversion pattern. Here, because the first fluorine layer and the second fluorine layer are low refractive index layers compared to that of the first color conversion pattern and the second color conversion pattern and may work as the optical recycling filter, there is no need to form an additional optical recycling filter.

In addition, a method of manufacturing a display apparatus includes providing a first color conversion inkjet solution, forming a first color conversion pattern and a first fluorine layer on the first color conversion pattern by curing the first color conversion inkjet solution, providing a second color conversion inkjet solution, and forming a second color conversion pattern by curing the second color conversion inkjet solution. Here, by the hydrophobic layer on the partitioning wall pattern, the second color conversion inkjet solution does not deviate from its corresponding pixel area (overflow is prevented and/or blocked), and is provided only in the corresponding pixel area. Accordingly, the second color conversion inkjet solution may be sufficiently and/or precisely provided.

In addition, the first fluorine layer is also hydrophobic, so that the first fluorine layer as well as the hydrophobic layer on the partitioning wall pattern may also act as a barrier to prevent and/or block overflow of the second color conversion inkjet solution.

In addition, since the first color conversion inkjet solution is sufficiently provided, the first fluorine layer may be formed to have a convex shape on its upper surface and be formed with a height higher than an upper surface of the hydrophobic layer. Accordingly, overflow of the second color conversion inkjet solution may be prevented and/or blocked more efficiently. Thus, even if a width of the upper surface of the partitioning wall pattern is narrower than the general case, the overflow of the inkjet solution can be easily controlled, and an aperture ratio of the display apparatus can be improved while using the inkjet process.

It is to be understood that both the foregoing general description and the following detailed description are exemplary and explanatory and are intended to provide further explanation of the invention as claimed

BRIEF DESCRIPTION OF THE DRAWINGS

The above and other features of the inventive concept will become more apparent by describing in detail example embodiments thereof with reference to the accompanying drawings, in which:

FIGS. 8A to 8J are cross-sectional views illustrating a method of manufacturing the display apparatus of FIG. 2;

DETAILED DESCRIPTION

Hereinafter, the inventive concept will be explained in more detail with reference to the accompanying drawings.

Figure 1:
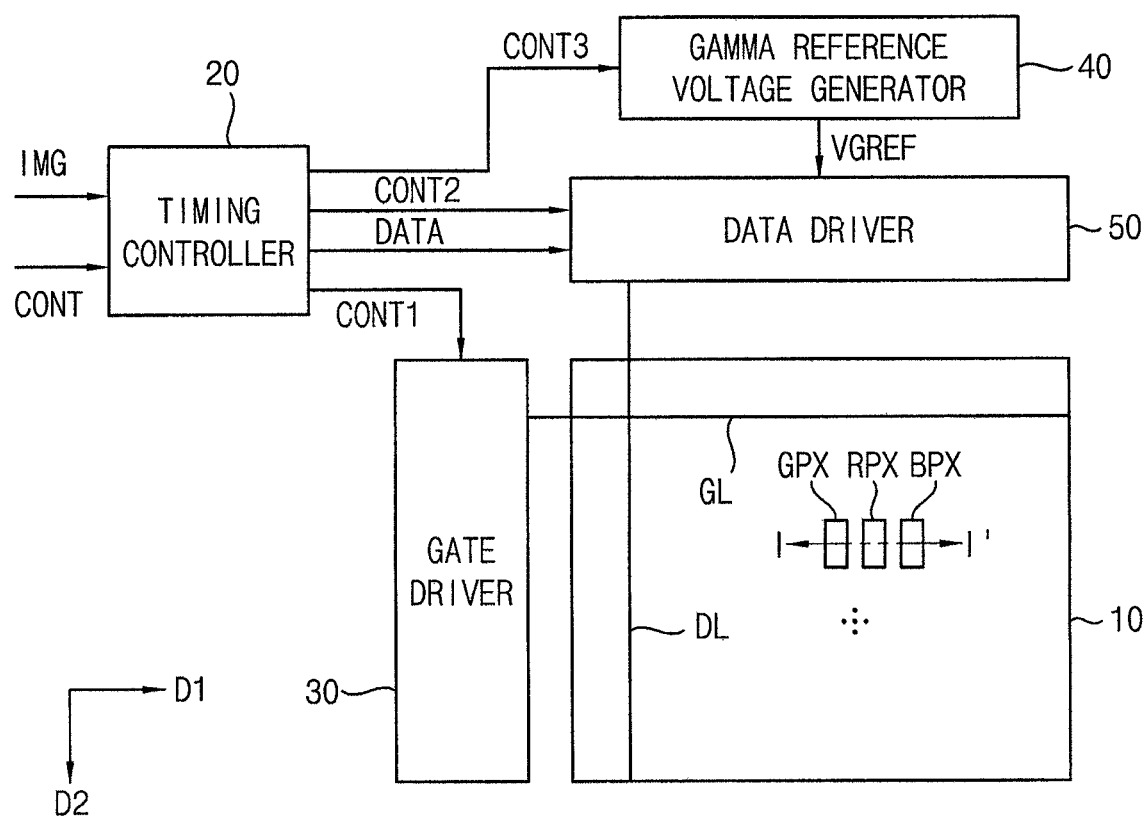
FIG. 1 is a block diagram illustrating a display apparatus according to an example embodiment of the inventive concept.

FIG. 1 is a block diagram illustrating a display apparatus according to an example embodiment of the inventive concept.

Referring to FIG. 1, the display apparatus may include a display panel 10 and a display panel driver. The display panel driver may include a timing controller 20, a gate driver 30, a gamma reference voltage generator 40 and a data driver 50. The display apparatus may further include a backlight unit (BLU of FIG. 2).

The display panel 10 includes a plurality of gate lines GL, a plurality of data lines DL, and a plurality of pixels electrically connected to the gate lines GL and the data lines DL, respectively. The gate lines GL may extend in a first direction D1, and the data lines DL may extend in a second direction D2 which crosses the first direction D1.

Each of the pixels may include a switching element, a liquid crystal capacitor electrically connected to the switching element, and a storage capacitor. The pixels may be arranged in a matrix form.

The display panel 10 may include a second substrate on which the gate lines, the data lines, the pixels, the switching elements are formed, and a first substrate facing the first substrate and including a second electrode which is a common electrode, and a liquid crystal layer between the first substrate and the second substrate.

A pixel structure of the display panel 10 will be described in more detail with reference to FIGS. 2 and 3.

The timing controller 20 may receive input image data IMG and an input control signal CONT from an external apparatus. The input image data may include red image data, green image data and blue image data. The input control signal CONT may include a master clock signal and a data enable signal. The input control signal CONT may further include a vertical synchronizing signal and a horizontal synchronizing signal.

The timing controller 20 may generate a first control signal CONT1, a second control signal CONT2, a third control signal CONT3 and a data signal DATA based on the input image data IMG and the input control signal CONT.

The timing controller 20 may generate the first control signal CONT1 for controlling an operation of the gate driver 30 based on the input control signal CONT, and outputs the first control signal CONT1 to the gate driver 30. The first control signal CONT1 may further include a vertical start signal and a gate clock signal.

The timing controller 20 may generate the second control signal CONT2 for controlling an operation of the data driver 50 based on the input control signal CONT, and outputs the second control signal CONT2 to the data driver 50. The second control signal CONT2 may include a horizontal start signal and a load signal.

The timing controller 20 may generate the data signal DATA based on the input image data IMG. The timing controller 20 may output the data signal DATA to the data driver 50.

The timing controller 20 may generate the third control signal CONT3 for controlling an operation of the gamma reference voltage generator 40 based on the input control signal CONT, and output the third control signal CONT3 to the gamma reference voltage generator 40.

The gate driver 30 may generate gate signals driving the gate lines GL in response to the first control signal CONT1 received from the timing controller 20. The gate driver 30 may sequentially output the gate signals to the gate lines GL.

The gamma reference voltage generator 40 may generate a gamma reference voltage VGREF in response to the third control signal CONT3 received from the timing controller 20. The gamma reference voltage generator 40 may provide the gamma reference voltage VGREF to the data driver 50. The gamma reference voltage VGREF may have a value corresponding to a level of the data signal DATA.

In an exemplary embodiment, the gamma reference voltage generator 40 may be disposed in the timing controller 20, or in the data driver 50.

The data driver 50 may receive the second control signal CONT2 and the data signal DATA from the timing controller 20, and receive the gamma reference voltages VGREF from the gamma reference voltage generator 40. The data driver 50 may convert the data signal DATA into data voltages having an analog type using the gamma reference voltages VGREF. The data driver 50 may output the data voltages to the data lines DL.

The display apparatus may include a green pixel area GPX emitting green light, a red pixel area RPX emitting red light, a blue pixel area PBX emitting blue light and a light blocking area to divide these areas.

Figure 2:
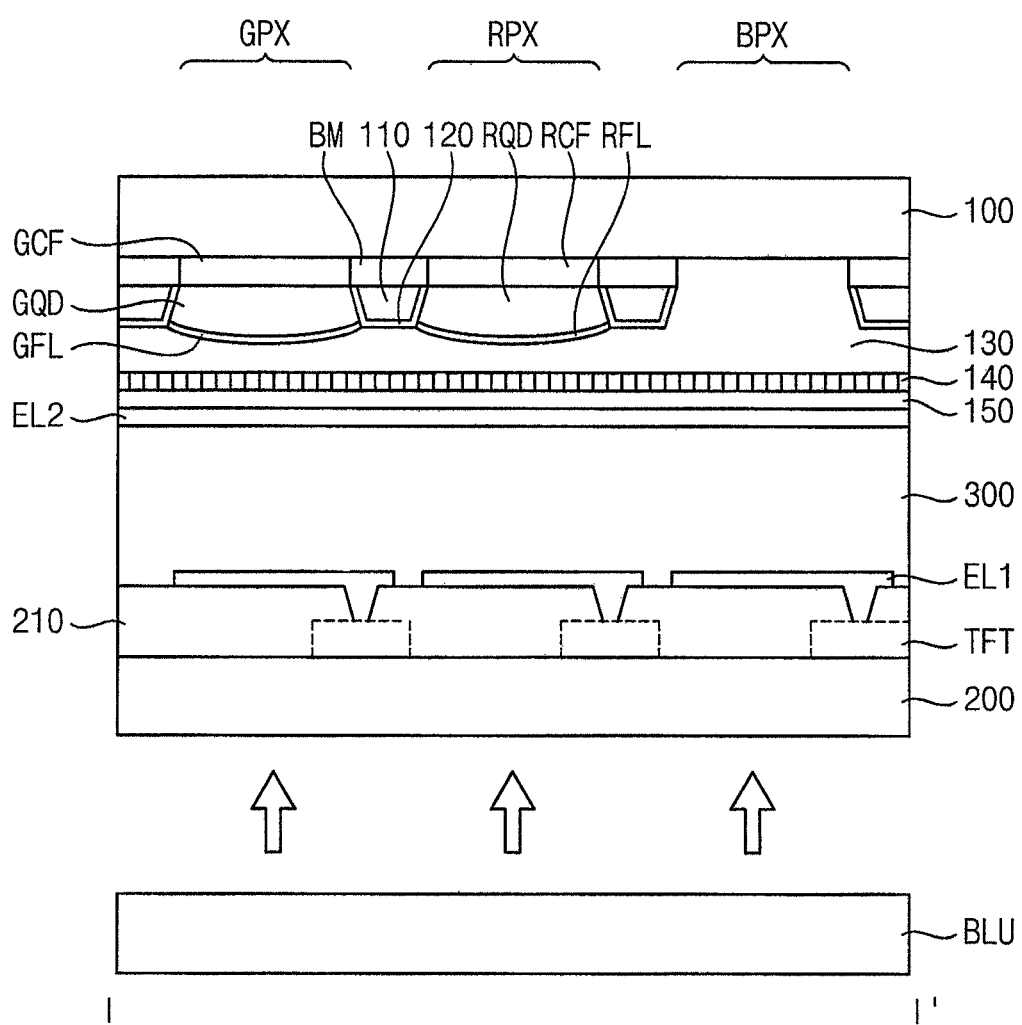
FIG. 2 is a cross-sectional view taken along a line I-I' of FIG. 1.

FIG. 2 is a cross-sectional view taken along a line I-I' of FIG. 1.

Referring to FIG. 2, the display apparatus may include a first substrate, a second substrate facing the first substrate, a liquid crystal layer 300 disposed between the first substrate and the second substrate and a backlight unit BLU. The first substrate may include a first base substrate 100, a light blocking pattern BM, a first color filter RCF, a second color filter GCF, a partitioning wall pattern 110, a hydrophobic layer 120, a first color conversion pattern RQD, a first fluorine layer RFL, a second color conversion layer GQD, a second fluorine layer GFL, a transparent layer 130, a wire grid polarizer 140, an insulation layer 150, and a second electrode EL2. The second substrate may include a second base substrate 200, a thin film transistor TFT, a TFT insulation layer 210, and a first electrode EL1.

The first base substrate 100 may include a transparent insulation substrate. For example, the first base substrate 100 may include a glass substrate, a quartz substrate, a transparent resin substrate, etc. Examples of the transparent resin substrate for the first base substrate 100 may include polyimide-based resin, acryl-based resin, polyacrylate-based resin, polycarbonate-based resin, polyether-based resin, sulfonic acid containing resin, polyethyleneterephthalate-based resin, etc.

The light blocking pattern BM may be disposed on the first base substrate 100. The light blocking pattern BM may include a blight blocking material. The light blocking pattern may be disposed in the light blocking area between a green pixel area GPX, a red pixel area RPX and a blue pixel area BPX to divide each of the pixel areas.

The first color filter RCF may be disposed in the red pixel area RPX on the first base substrate 100 on which the light blocking pattern BM is disposed. The first color filter RCF may be a red color filter. The first color filter RCF may pass only a wavelength band corresponding to a red light of light passing through the first color filter RCF.

The second color filter GCF may be disposed in the green pixel area GPX on the first base substrate 100 on which the light blocking pattern BM is disposed. The second color filter GCF may be a green color filter. The second color filter GCF may pass only a wavelength band corresponding to a green light of light passing through the second color filter GCF.

The partitioning wall pattern 110 may be disposed on the light blocking pattern BM. The partitioning wall pattern 110 may be formed using a photoresist material. The partitioning wall pattern 110 is a structure for partitioning the red pixel area RPX in which the first color conversion pattern RQD is formed and the green pixel area GPX in which the second color conversion pattern GPX is formed to form the first color conversion pattern RQD and the second color conversion pattern GQD at a set or predetermined location when the first color conversion pattern RQD and the second color conversion pattern GQD are formed by the ink jet method.

The hydrophobic layer 120 may be formed on the partitioning wall pattern 110. The hydrophobic layer 120 is hydrophobic in water, and the hydrophobic layer 120 may prevent and/or block the first color conversion pattern RQD and the second color conversion pattern GQD from overflowing out of the partitioning wall pattern 110 when the first color conversion pattern RQD and the second color conversion pattern GQD are formed in the inkjet method. The hydrophobic layer 120 may be formed by partially hydrophobizing a surface of the partitioning wall pattern 110 by plasma treatment or the like. Accordingly, the hydrophobic layer 120 may be formed on upper and side surfaces of the partitioning wall pattern 110 except for a lower surface that contacts the light blocking pattern BM.

The first color conversion pattern RQD may be formed on the first color filter RCF in the red pixel area RPX. The first color conversion pattern RQD may be a red color conversion pattern. The first color conversion pattern RQD may convert a blue light provided from the backlight unit BLU into red light. For example, the first color conversion pattern RQD may include red quantum dot particles and/or red phosphor. In addition, the first color conversion pattern RQD may further include epoxy and/or epoxy-acrylate. For example, the first color conversion pattern RQD may further include MMA (methyl-metha-acrylate) and/or PMMA (Polymethyl-metha-acrylate).

The first fluorine layer RFL may be disposed on the first color conversion pattern RQD. The first fluorine layer RFL may include fluorine and/or fluoropolymer. The first fluorine layer RFL may be formed on the first color conversion pattern RQD due to a self-stratification of fluorine surfactant component of inkjet solution in a curing process to form the first color conversion pattern RQD. In addition, a height of a top surface of the first fluorine layer RFL from the first base substrate 100 may be greater than or equal to a height of a top surface of the hydrophobic layer 120 on the partitioning wall pattern 110 from the first base substrate 100.

The second color conversion pattern GQD may be disposed on the second color filter GCF in the green pixel area GPX. The second color conversion pattern GQD may be a green color conversion pattern. The second color conversion pattern GQD may convert a blue light provided from the backlight unit BLU into green light. For example, the second color conversion pattern GQD may include green quantum dot particles and/or green phosphor. In addition, the second color conversion pattern GQD may further include epoxy and/or epoxy-acrylate. For example, the second color conversion pattern GQD may further include MMA (methyl-metha-acrylate) and/or PMMA (Poly-memethyl-metha-acrylate).

The second fluorine layer GFL may be disposed on the second color conversion pattern GQD. The second fluorine layer GFL may include fluorine and/or fluoropolymer. The second fluorine layer GFL may be formed on the second color conversion pattern GQD due to a self-stratification of fluorine surfactant component of inkjet solution in a curing process to form the second color conversion pattern GQD.

The red or green quantum dot may be a material that has a nano-scaled structure and may include several hundred to several thousand atoms. Since the quantum dot is very small in size, a quantum confinement effect may occur. The quantum confinement effect may indicate that an energy band gap of an object is increased when the nano size object becomes smaller. When the light having energy higher than that of the band gap is incident to the quantum dot, the quantum dot may absorb the light and may emit a second light having a specific wavelength and an energy level in the ground state. The wavelength of the emitted second light may have a value corresponding to the band gap. When a size and a composition of the quantum dot are adjusted, the emission property of the quantum dot may be controlled by the quantum confinement.

The composition of the quantum dots is not limited to a specific composition, and any suitable composition may be used. For example, the quantum dot may be a quantum dot of Group II-VI elements, Group III-V elements, Group IV elements, or Group IV-VI elements. The Group II elements may be selected from the group consisting of at least one of zinc, cadmium, and mercury. The group III elements may be selected from the group consisting of at least one of aluminum, gallium, and indium. The Group IV elements may be selected from the group consisting of at least one of silicon, germanium, tin, and lead. The Group V elements may be selected from the group consisting of at least one of nitrogen, phosphorus, and arsenic. The Group VI elements may be selected from the group consisting of at least one of sulfur, selenium, and tellurium.

The transparent layer 130 may be disposed on the first base substrate 100 on which the first color conversion pattern RQD and the second color conversion pattern GQD are disposed. The transparent layer 130 may be disposed in the blue pixel area BPX between the partitioning wall pattern 110, and may be formed corresponding to the entire first base substrate 100 to cover all of the partitioning wall pattern 110, the first fluorine layer RFL and the second fluorine layer GFL. The transparent layer 130 may include scattering particles that change traveling direction of light passing therethrough without changing color. The scattering particles may be particles of $TiO_2$ or the like. Size of the scattering particle may be similar to size of the red quantum dot particle or the green quantum dot particle.

The wire grid polarizer 140 may be disposed on the transparent layer 130. The wire grid polarizer 140 may include a plurality of fine lines extending in one direction and formed at uniform intervals to form a wire grid. The fine lines may have pitch of about 50 nm (nanometers) to 150 nm. The pitch may be defined as sum of width of one of the fine lines and a distance between two of the fine lines disposed adjacent to each other.

The insulation layer 150 may be disposed on the wire grid polarizer 140 for capping the wire grid polarizer 140. The insulation layer 150 may include inorganic and/or organic insulation material.

The second electrode EL2 may be disposed on (below) the insulation layer 150. A common voltage may be applied to the second electrode LE2. The second electrode EL 2 may include a transparent conductive material. For example, the second electrode EL2 may include indium tin oxide (ITO), indium zinc oxide (IZO), etc.

The second base substrate 200 may be disposed to face the first base substrate 100. The second base substrate 200 may include a glass substrate, a quartz substrate, a transparent resin substrate, etc. Examples of the transparent resin substrate for the second base substrate 200 may include polyimide-based resin, acryl-based resin, polyacrylate-based resin, polycarbonate-based resin, polyether-based resin, sulfonic acid containing resin, polyethyleneterephthalate-based resin, etc.

The thin film transistor TFT may be disposed on the second base substrate 200. The thin film transistor TFT may be electrically connected to a data line (refers to DL of FIG. 1) and a gate line (refers to GL of FIG. 1).

The TFT insulation layer 210 may be disposed on the second base substrate 200 on which the thin film transistor TFT is formed. Each of the thin film transistor TFT and the TFT insulation layer 210 is shown as one configuration in the figures, but may be composed of a plurality of layers. For example, a gate pattern, a gate insulating layer, an active pattern, a data pattern, a data insulating layer, and the like may be sequentially formed on the second base substrate 200 to form the thin film transistor TFT and the TFT insulating layer 210.

The first electrode EL1 may be disposed on the TFT insulation layer 210. The first electrode EL1 may be electrically connected to the thin film transistor TFT through a contact hole formed through the TFT insulation layer 210. The first electrode EL1 may include a transparent conductive material. For example, the first electrode EL1 may include indium tin oxide (ITO), indium zinc oxide (IZO), etc.

The liquid crystal layer 300 may be disposed between the first electrode EL1 and the second electrode EL2. The liquid crystal layer 300 may include liquid crystal molecules having optical anisotropy. The liquid crystal molecules are driven by electric field, so that an image is displayed by passing or blocking light through the liquid crystal layer 300.

The backlight unit BLU may be disposed under the second base substrate 200 to provide light toward the liquid crystal layer 300. In particular, the backlight unit BLU may generate blue light and provide this blue light toward the liquid crystal layer 300.

In one embodiment, the display apparatus may further include an upper alignment layer formed between the liquid crystal layer 300 and the second electrode EL2, a lower alignment layer formed between the liquid crystal layer 300 and the first electrode EL1, and a lower polarizer disposed on (below) the second base substrate 200, etc.

Although the display apparatus includes the liquid crystal layer in the present embodiment, the display apparatus may be a device for generating light for displaying an image in addition to a liquid crystal display device and may be a variety of devices, such as an organic light emitting display, an electrophoretic display, an electrowetting display, and the like, but it is not limited thereto.

Each of the first fluorine layer RFL and the second fluorine layer GFL is a layer having smaller refractive index than that of the first color conversion pattern RQD and the second color conversion pattern GQD. Since the first fluorine layer RFL and the second fluorine layer GFL further contain fluorine (F) compared with the first color conversion pattern RQD and the second color conversion pattern GQD, respectively, so that the first fluorine layer RFL and the second fluorine layer GFL have lower refractive index than that of the first color conversion pattern RQD and the second color conversion pattern GQD, respectively. Accordingly, reflected light which is generated from the backlight unit BLU and is reflected while passing through the first or second color conversion pattern RQD or GQD, the first or second color filter RCF or GCF and the first base substrate 100, may be reflected to be reused and/or recycled.

Thus, the first fluorine layer RFL and the second fluorine layer GFL are low refractive index layers compared to the first color conversion pattern RQD and the second color conversion pattern GQD and may act as an optical recycling filter. Since the first fluorine layer RFL and the second fluorine layer GFL which is naturally formed by the self-stratification during the curing process to form the first color conversion pattern RQD and the second color conversion pattern GQD work as the optical recycling filter, there is no need to form an additional optical recycling filter.

Figure 3:
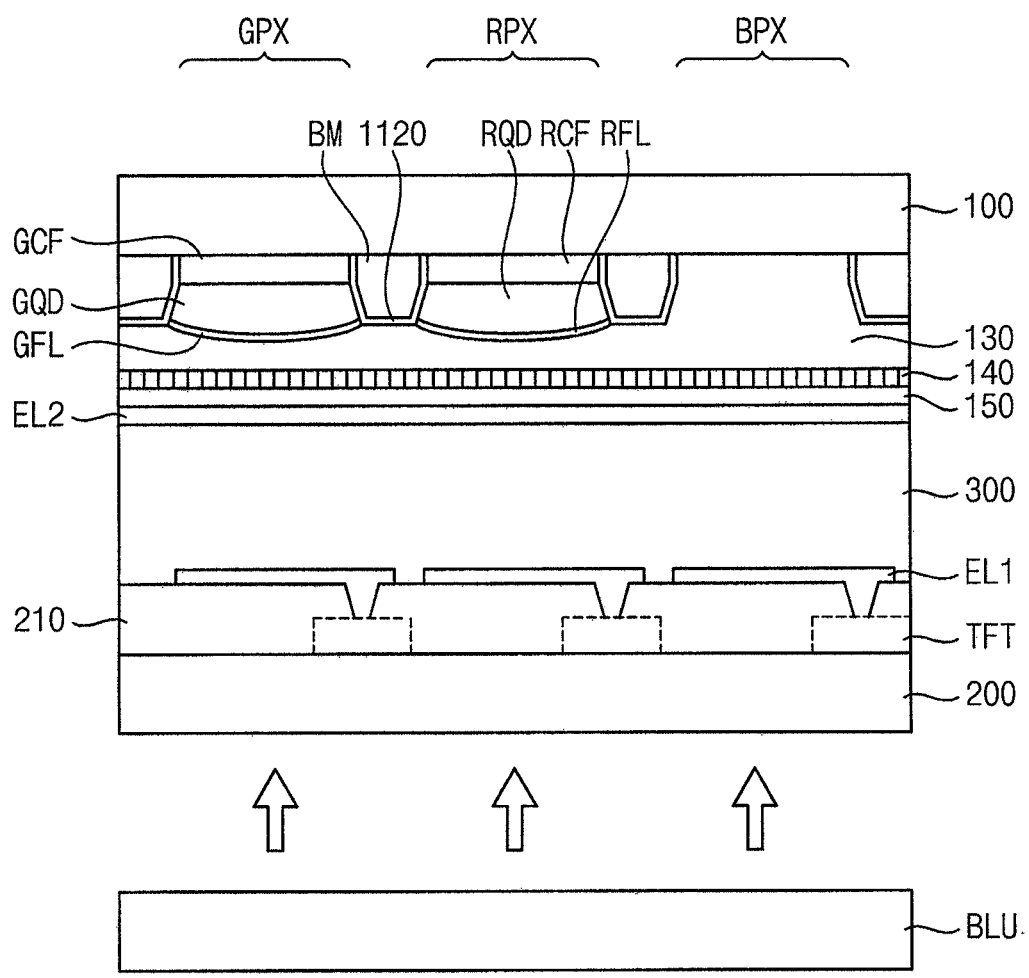
FIG. 3 is a cross-sectional view illustrating a display apparatus according to an example embodiment of the inventive concept.

FIG. 3 is a cross-sectional view illustrating a display apparatus according to an example embodiment of the inventive concept.

Referring to FIG. 3, the display apparatus may be substantially the same as the display apparatus of FIG. 2 except that a light blocking pattern BM acts as a partitioning wall pattern instead of the partitioning wall pattern. Therefore, repeated description will be omitted.

The display apparatus may include a first substrate, a second substrate facing the first substrate, a liquid crystal layer 300 disposed between a backlight unit BLU and the first substrate and the second substrate. The first substrate may include a first base substrate 100, a light blocking pattern BM, a first color filter RCF, a second color filter GCF, a hydrophobic layer 1120, a first color conversion pattern RQD, a first fluorine layer RFL, a second color conversion layer GQD, a second fluorine layer GFL, a transparent layer 130, a wire grid polarizer 140, an insulation layer 150 and a second electrode EL2. The second substrate may include a second base substrate 200, a thin film transistor TFT, a TFT insulation layer 210, and a first electrode EL1.

The light blocking pattern BM may be disposed on the first base substrate 100. The light blocking pattern BM may include a light blocking material. The light blocking pattern may be disposed in the light blocking area between a green pixel area GPX, a red pixel area RPX and a blue pixel area BPX to divide each of the pixel areas.

The hydrophobic layer 1120 may be formed on the light blocking pattern BM. The hydrophobic layer 1120 is hydrophobic in water, and the hydrophobic layer 120 may prevent and/or block the first color conversion pattern RQD and the second color conversion pattern GQD from overflowing out when the first color conversion pattern RQD and the second color conversion pattern GQD are formed in the inkjet method. The hydrophobic layer 120 may be formed by partially hydrophobizing a surface of the light blocking pattern BM by plasma treatment or the like.

The first color filter RCF may be disposed in the red pixel area RPX on the first base substrate 100 on which the light blocking pattern BM is disposed. The second color filter GCF may be disposed in the green pixel area GPX on the first base substrate 100 on which the light blocking pattern BM is disposed.

The first color conversion pattern RQD may be disposed on the first color filter RCF in the red pixel area RPX. The first fluorine layer RFL may be disposed on the first color conversion pattern RQD.

The second color conversion pattern GQD may be disposed on the second color filter GCF in the green pixel area GPX. The second fluorine layer GFL may be disposed on the second color conversion pattern GQD.

In the present embodiment, the light blocking pattern BM may be formed at a height sufficiently high to work not only to block light but also to work as a partitioning wall pattern of the display apparatus of FIG. 2. Therefore, unlike the display apparatus of FIG. 2, it is not necessary to form an additional partitioning wall pattern.

Figure 4:
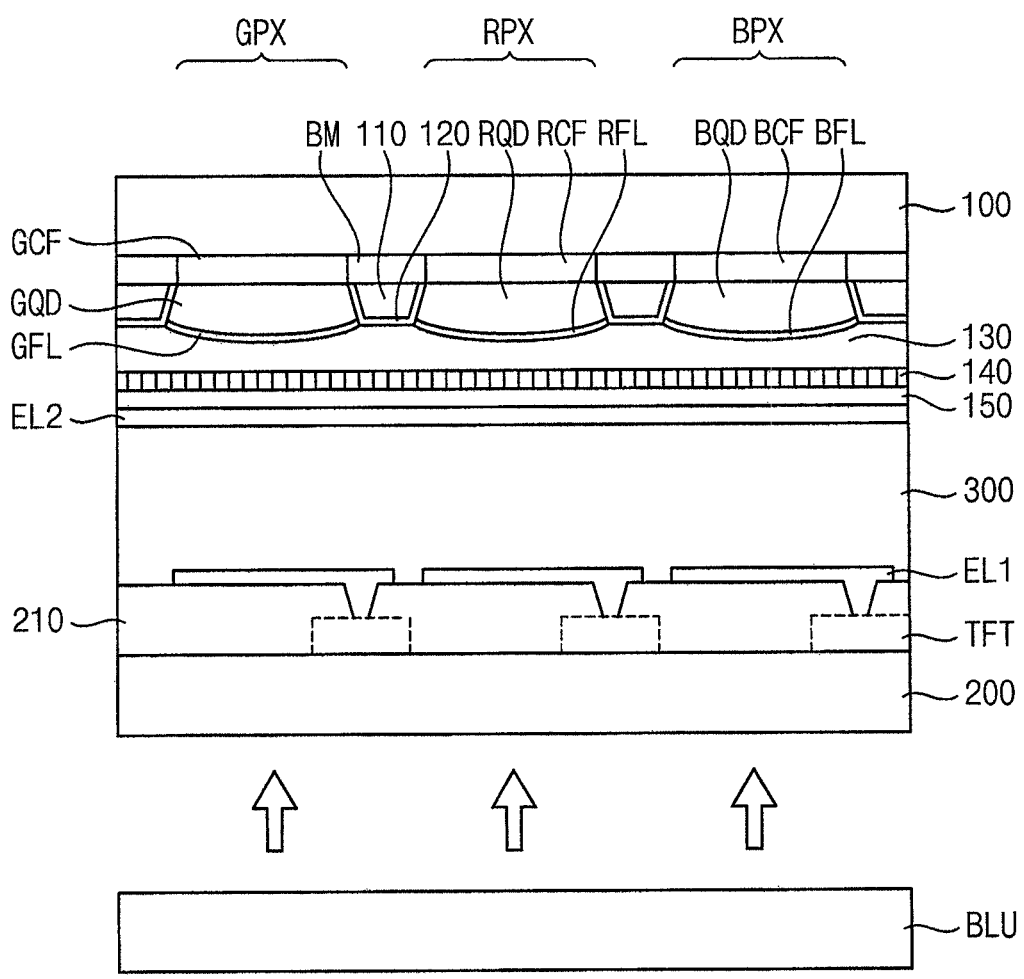
FIG. 4 is a cross-sectional view illustrating a display apparatus according to an example embodiment of the inventive concept.

FIG. 4 is a cross-sectional view illustrating a display apparatus according to an example embodiment of the inventive concept.

Referring FIG. 4, the display apparatus may be substantially the same as the display apparatus of FIG. 2, except for a third color conversion pattern BQD disposed in a blue pixel region BPX and a third fluorine layer BFL and the backlight unit BLU. Therefore, repeated description will be omitted.

The display apparatus may include a first substrate, a second substrate facing the first substrate, a liquid crystal layer 300 disposed between the first substrate and the second substrate and a backlight unit BLU. The first substrate may include a first base substrate 100, a light blocking pattern BM, a first color filter RCF, a second color filter GCF, a third color filter BCF, a partitioning wall pattern 110, a hydrophobic layer 120, a first color conversion pattern RQD, a first fluorine layer RFL, a second color conversion layer GQD, a second fluorine layer GFL, a third color conversion layer BQD, a third fluorine layer BFL, a transparent layer 130, a wire grid polarizer 140, an insulation layer 150 and a second electrode EL2. The second substrate may include a second base substrate 200, a thin film transistor TFT, a TFT insulation layer 210 and a first electrode EL1.

The third color filter BCF may be disposed in a blue pixel area BPX on the first base substrate 100 on which the light blocking pattern BM is disposed. The third color filter BCF may be a blue color filter. The third color filter BCF may pass only a wavelength band corresponding to a blue light of light passing through the third color filter BCF.

The third color conversion pattern BQD may be formed on the third color filter BCF in the blue pixel area BPX. The third color conversion pattern BQD may be a blue color conversion pattern. The third color conversion pattern BQD may convert a light provided from the backlight unit BLU into blue light. For example, the third color conversion pattern BQD may include blue quantum dot particles and/or blue phosphor. In addition, the third color conversion pattern BQD may further include epoxy and/or epoxy-acrylate. For example, the third color conversion pattern BQD may further include MMA (methyl-metha-acrylate) and/or PMMA (Poly-memethyl-metha-acrylate).

The third fluorine layer BFL may be disposed on the third color conversion pattern BQD. The third fluorine layer BFL may include fluorine and/or fluoropolymer. The third fluorine layer BFL may be formed on the third color conversion pattern BQD due to a self-stratification of fluorine surfactant component of inkjet solution in a curing process to form the third color conversion pattern BQD.

The transparent layer 130 may be formed corresponding to the entire first base substrate 100 to cover all of the partitioning wall pattern 110, the first fluorine layer RFL, the second fluorine layer GFL and the third fluorine layer BFL.

The backlight unit BLU may provide white light unlike the display apparatus of FIG. 2.

Figure 5:
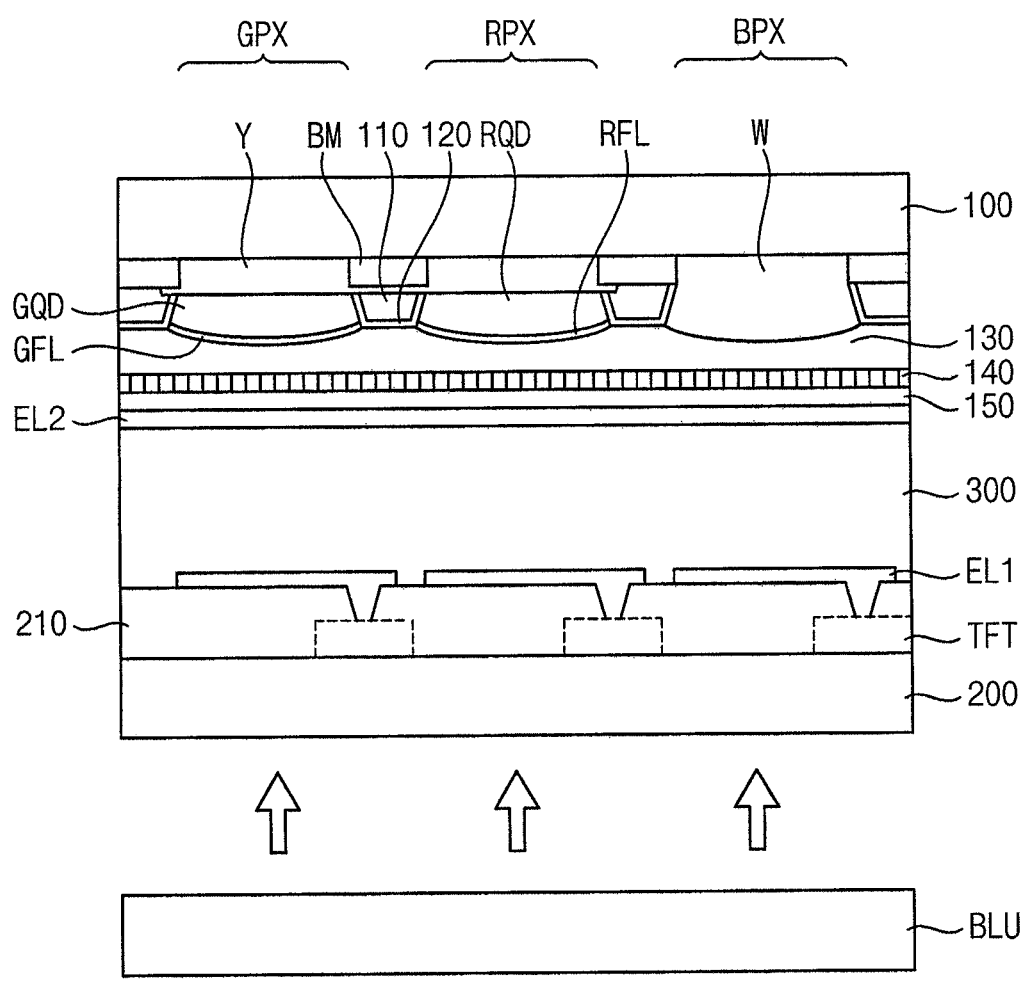
FIG. 5 is a cross-sectional view illustrating a display apparatus according to an example embodiment of the inventive concept.

FIG. 5 is a cross-sectional view illustrating a display apparatus according to an example embodiment of the inventive concept.

Referring to FIG. 5, the display apparatus may be substantially the same as the display apparatus of FIG. 2, except that the display apparatus further includes a blue light blocking pattern Y and a transparent pattern W disposed in a blue pixel area BPX. Therefore, repeated description will be omitted.

The display apparatus may include a first substrate, a second substrate facing the first substrate, a liquid crystal layer 300 disposed between the first substrate and the second substrate and a backlight unit BLU. The first substrate may include a first base substrate 100, a light blocking pattern BM, a blue light blocking pattern Y, a partitioning wall pattern 110, a hydrophobic layer 120, a first color conversion pattern RQD, a first fluorine layer RFL, a second color conversion layer GQD, a second fluorine layer GFL, a transparent pattern B, a transparent layer 130, a wire grid polarizer 140, an insulation layer 150 and a second electrode EL2. The second substrate may include a second base substrate 200, a thin film transistor TFT, a TFT insulation layer 210 and a first electrode EL1.

The blue light blocking pattern Y may be disposed in a red pixel area RPX and a green pixel area GPX on the first base substrate on which the light blocking pattern BM is disposed. The blue light blocking pattern Y may pass only light having a wavelength band excluding a blue wavelength band and may block light corresponding to the blue wavelength band. The blue light blocking pattern Y may be a yellow color filter.

The partitioning wall pattern 110 may be disposed on the blue light blocking pattern Y and the light blocking pattern BM to overlap the light blocking pattern BM.

The transparent pattern B may be disposed on the first base substrate 100 in the blue pixel area BPX. The transparent pattern may include scattering particles that change traveling direction of light passing therethrough without changing color. The scattering particles may be particles of $TiO_2$ or the like. Size of the scattering particle may be similar to size of the red quantum dot particle or the green quantum dot particle. In addition, the transparent pattern B may further include a blue pigment for converting light transmitted through the transparent pattern B into blue light.

Figure 6:
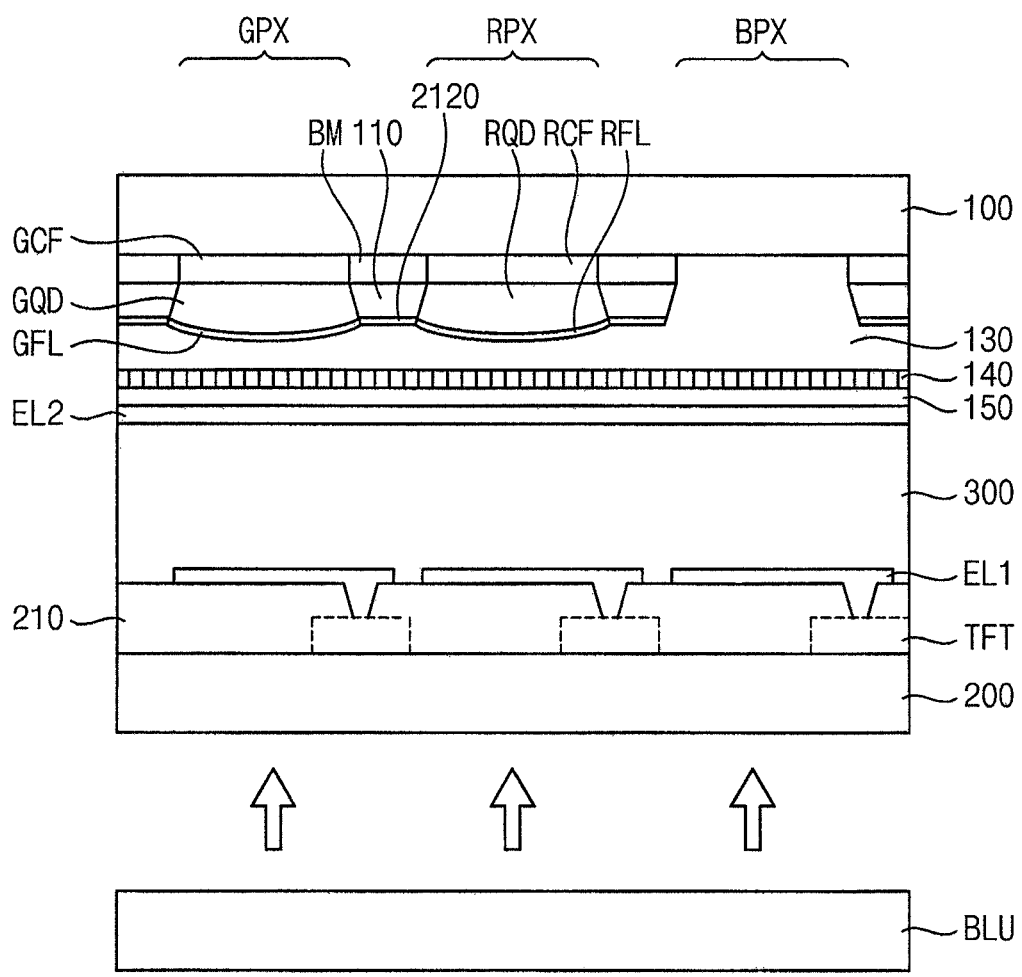
FIG. 6 is a cross-sectional view illustrating a display apparatus according to an example embodiment of the inventive concept.

FIG. 6 is a cross-sectional view illustrating a display apparatus according to an example embodiment of the inventive concept.

Referring to FIG. 6, the display apparatus may be substantially the same as the display apparatus of FIG. 2, except that a hydrophobic layer 2120 is formed only on an upper surface of the partitioning wall pattern 110. Therefore, repeated description will be omitted.

The display apparatus may include a first substrate, a second substrate facing the first substrate, a liquid crystal layer 300 disposed between the first substrate and the second substrate and a backlight unit BLU. The first substrate may include a first base substrate 100, a light blocking pattern BM, a first color filter RCF, a second color filter GCF, a partitioning wall pattern 110, a hydrophobic layer 2120, a first color conversion pattern RQD, a first fluorine layer RFL, a second color conversion layer GQD, a second fluorine layer GFL, a transparent layer 130, a wire grid polarizer 140, an insulation layer 150 and a second electrode EL2. The second substrate may include a second base substrate 200, a thin film transistor TFT, a TFT insulation layer 210 and a first electrode EL1.

The hydrophobic layer 2120 may be formed on the partitioning wall pattern 110. The hydrophobic layer 2120 may be formed only on the upper surface of the partitioning wall pattern 110 which is opposite to a lower surface that makes contact with the light blocking pattern BM.

Figure 7:
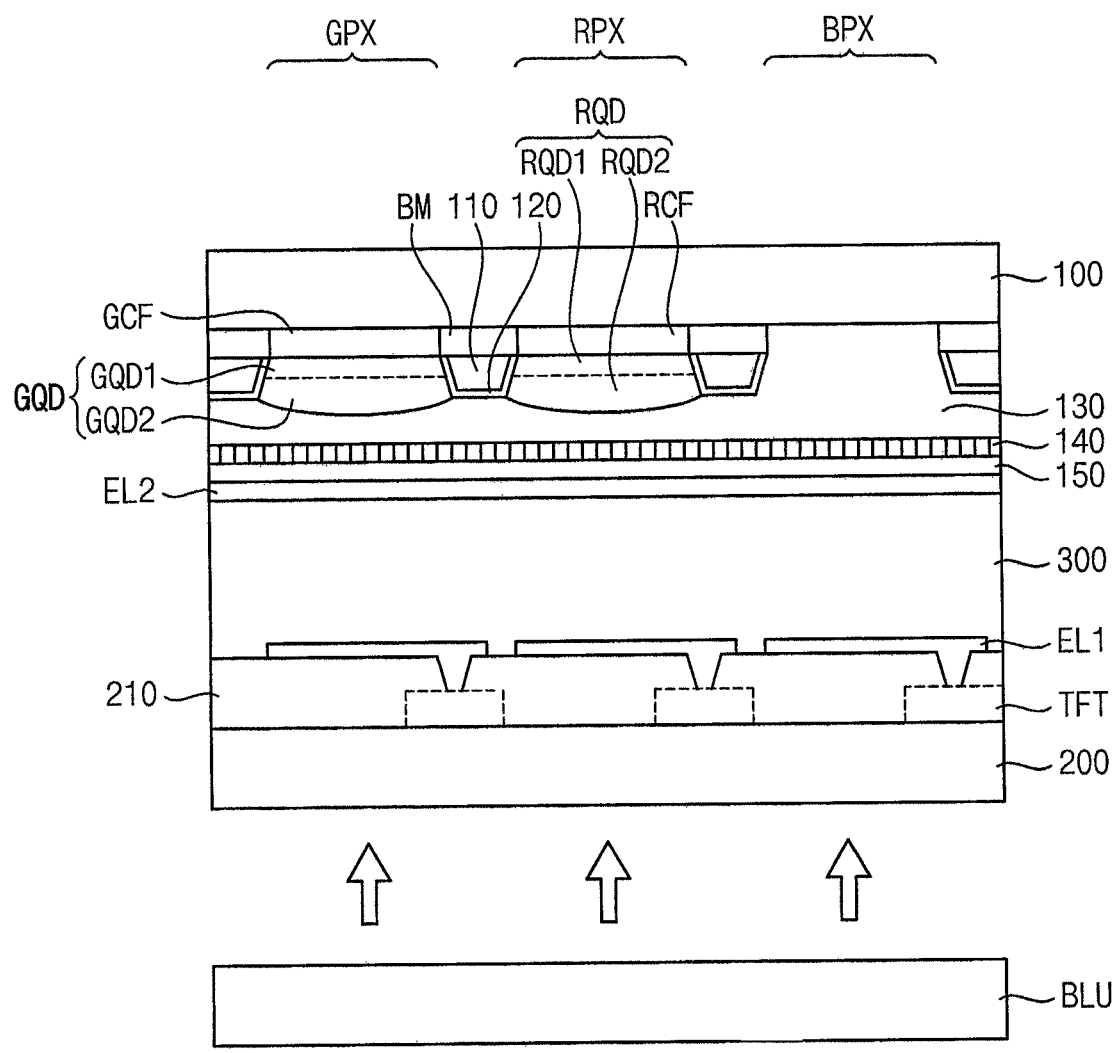
FIG. 7 is a cross-sectional view illustrating a display apparatus according to an example embodiment of the inventive concept.

FIG. 7 is a cross-sectional view illustrating a display apparatus according to an example embodiment of the inventive concept.

Referring to FIG. 7, the display apparatus may be substantially the same as the display apparatus of FIG. 2, except that a fluorine layer does not form a separate layer and a color conversion layer includes a first portion and a second portion which includes fluorine. Therefore, repeated descriptions will be omitted.

The display apparatus may include a first substrate, a second substrate facing the first substrate, a liquid crystal layer 300 disposed between the first substrate and the second substrate and a backlight unit BLU. The first substrate may include a first base substrate 100, a light blocking pattern BM, a first color filter RCF, a second color filter GCF, a partitioning wall pattern 110, a hydrophobic layer 120, a first color conversion pattern RQD, a second color conversion layer GQD, a transparent layer 130, a wire grid polarizer 140, an insulation layer 150 and a second electrode EL2. The second substrate may include a second base substrate 200, a thin film transistor TFT, a TFT insulation layer 210 and a first electrode EL1.

The first color conversion pattern RQD may include a first portion RQD1 and a second portion RQD2 disposed on the first portion RQD1. The first portion RQD1 of the first color conversion pattern RQD is closer to the first base substrate 100 than the second portion RQD2. The second portion RQD2 of the first color conversion pattern RQD is further from the first base substrate 100 than the first portion RQD1 is from the first base substrate 100.

The first color conversion pattern RQD which includes the first portion RQD1 and the second portion RQD2 may be a red color conversion pattern. The first color conversion pattern RQD may include red quantum dot particles and/or red phosphor. In addition, the first color conversion pattern RQD may further include epoxy and/or epoxy-acrylate. For example, the first color conversion pattern RQD may further include MMA (methyl-metha-acrylate) and/or PMMA (Poly-memethyl-metha-acrylate). In addition, the first color conversion pattern RQD may further include fluorine and/or fluoropolymer.

Here, a content of fluorine and/or fluoropolymer of the second portion RQD2 is greater than a content of fluorine and/or fluoropolymer of the first portion RQD1. Thus, in the display apparatus of FIG. 2, the fluorine surfactant component in the inkjet solution is relatively completely separated, and the fluorine layer is formed so as to be separated from the color conversion pattern. In this embodiment, separation is relatively incomplete, so that a boundary between the first portion RQD1 and the second portion RQD2 may not be clear.

The second color conversion pattern GQD may include a first portion GQD1 and a second portion GQD2 disposed on the first portion GQD1. The first portion GQD1 of the second color conversion pattern GQD is closer to the first base substrate 100 than the second portion GQD2.

The second color conversion pattern GQD which includes the first portion GQD1 and the second portion GQD2 may be a green color conversion pattern. The second color conversion pattern GQD may include green quantum dot particles and/or green phosphor. In addition, the second color conversion pattern GQD may further include epoxy and/or epoxy-acrylate. For example, the second color conversion pattern GQD may further include MMA (methyl-metha-acrylate) and/or PMMA (Poly-memethyl-metha-acrylate). In addition, the second color conversion pattern GQD may further include fluorine and/or fluoropolymer.

Here, a content of fluorine and/or fluoropolymer of the second portion GQD2 is greater than a content of fluorine and/or fluoropolymer of the first portion GQD1. Thus, in the display apparatus of FIG. 2, the fluorine surfactant component in the inkjet solution is relatively completely separated, and the fluorine layer is formed so as to be separated from the color conversion pattern. In this embodiment, separation is relatively incomplete, so that a boundary between the first portion GQD1 and the second portion GQD2 may not be clear.

FIGS. 8A to 8J are cross-sectional views illustrating a method of manufacturing the display apparatus of FIG. 2.

Figure 8A:
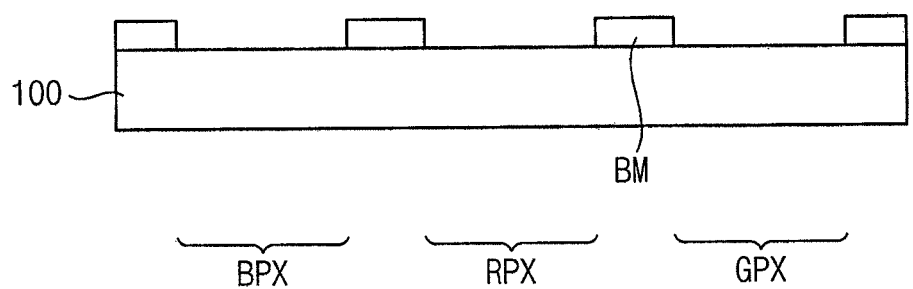

Referring to FIG. 8A, a light blocking pattern BM may be formed on a first base substrate 100. The light blocking pattern BM may be formed by coating a photoresist material including a light blocking material on the first base substrate 100, exposing and developing the same. The light blocking pattern BM may define a red pixel area RPX, a green pixel area GPX, and a blue pixel area BPX.

Figure 8B:
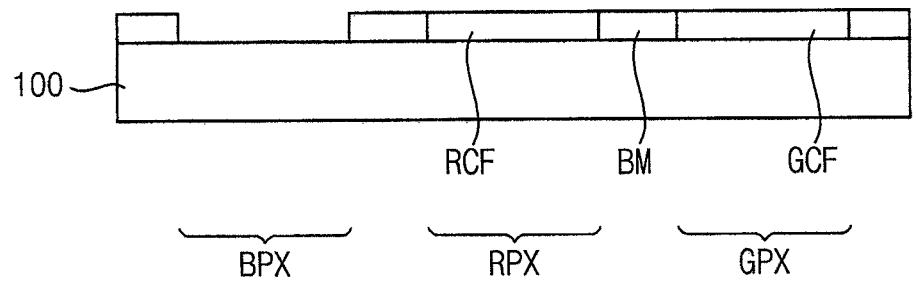

Referring to FIG. 8B, a first color filter RCF may be formed in the red pixel area RPX on the first base substrate 100 on which the light blocking pattern BM is formed. The first color filter RCF may be formed using a photoresist method, an ink jet method, or the like.

A second color filter (GCF) may be formed on the green pixel area GPX on the first base substrate 100 on which the light blocking pattern BM is formed. The second color filter GCF may be formed using a photoresist method, an ink jet method, or the like.

Figure 8C:
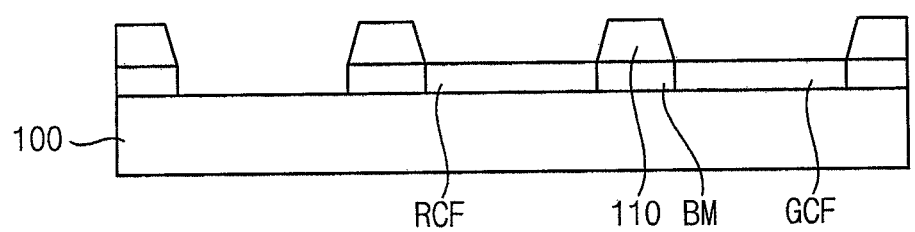

Referring to FIG. 8C, a partitioning wall pattern 110 may be formed on the light blocking pattern BM. The partitioning wall pattern 110 may be formed by coating a photoresist material on the base substrate 100 on which the light blocking pattern BM is formed, exposing and developing the same. It is preferable that the partitioning wall pattern 110 overlaps with the light blocking pattern BM and has substantially the same pattern shape as that of the light blocking pattern BM, so that the same mask as that used in the exposure process to form the light blocking pattern BM can be used.

Figure 8D:
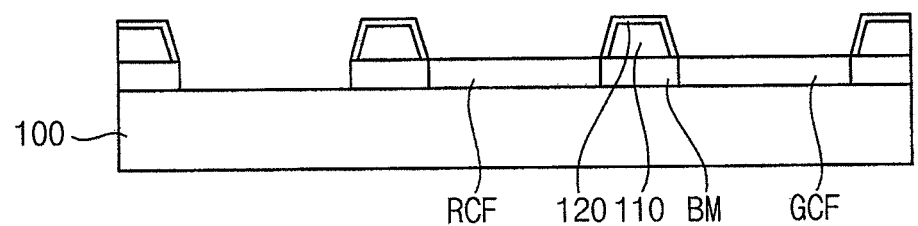

Referring to FIG. 8D, a hydrophobic layer 120 may be formed on upper and side surfaces of the partitioning wall pattern 110 by hydrophobic treatment of the upper and side surfaces of the partitioning wall pattern 110. For example, the hydrophobic layer 120 may be formed by partially hydrophobizing the upper and side surfaces of the light blocking pattern BM by plasma treatment or the like.

Figure 8E:
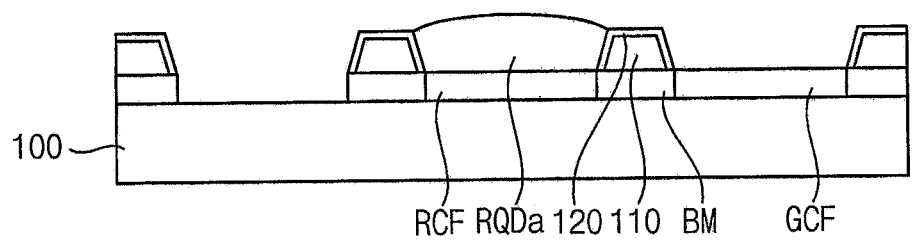

Referring to FIG. 8E, a first color conversion inkjet solution RQDa may be provided on the first color filter RCF in the red pixel area RPX using an inkjet method. The first color conversion inkjet solution RQDa may include fluorine surfactant and red quantum dot particles and/or red phosphor. In addition, the first color conversion inkjet solution RQDa may further include epoxy and/or epoxy-acrylate. For example, the first color conversion inkjet solution RQDa may further include MMA (methyl-metha-acrylate) and/or PMMA (Poly-memethyl-metha-acrylate). The first color conversion inkjet solution RQDa may further include a solvent for an inkjet process. The solvent may be hydrophilic.

Here, by the hydrophobic layer 120 on the partitioning wall pattern 110, the hydrophilic first color conversion inkjet solution RQDa does not deviate from the red pixel area RPX (overflow is prevented and/or blocked), and is provided only in the red pixel area RPX. Accordingly, the first color conversion inkjet solution RQDa may be sufficiently provided.

Figure 8F:
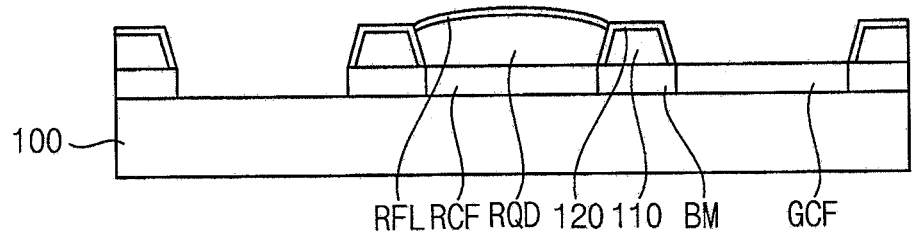

Referring to FIG. 8F, the first color conversion inkjet solution RQDa may be cured by heating the first color conversion inkjet solution RQDa. Accordingly, the first color conversion pattern RQD may be formed. Here, a first fluorine layer RFL may be formed on the first color conversion pattern RQD due to a self-stratification of fluorine surfactant component of the first color conversion inkjet solution RQDa. The first fluorine layer RFL may include fluorine and/or fluoropolymer.

The self-stratification occurs in a phase-separated liquid mixture containing a low surface energy layered resin and a substantially higher free surface energy base resin, and at the time of heat treatment at a temperature to maintain fluidity, evaporation of the layer causes acceleration of the layer separation. That is, due to the low expression tension of the fluorine component contained in the fluorinated surfactant, phase separation progresses may be performed by a property of the fluorine component coming into contact with an upper air layer, the first color conversion pattern forms a layer of fluorine components on top of the first color conversion pattern RQD. Accordingly, a first fluorine layer RFL on the first color conversion pattern RQD and the first color conversion pattern RQD may be formed.

Figure 8G:
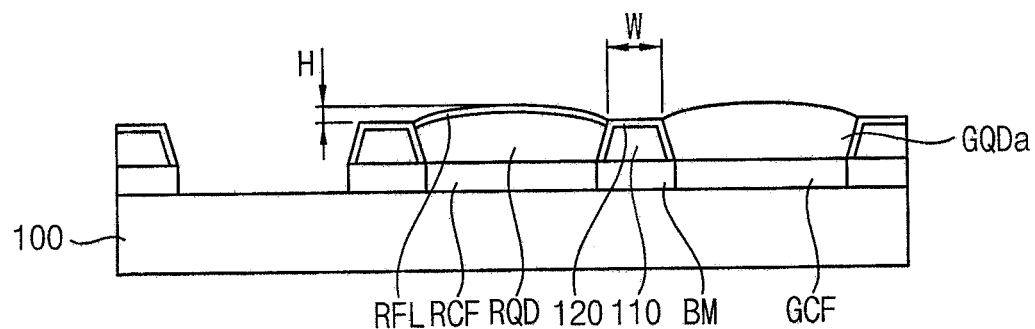

Referring to FIG. 8G, a second color conversion inkjet solution GQDa may be provided on the second color filter GCF in the green pixel area GPX using an inkjet method. The second color conversion inkjet solution GQDa may include fluorine surfactant and green quantum dot particles and/or green phosphor. In addition the second color conversion inkjet solution GQDa may further include epoxy and/or epoxy-acrylate. For example, the second color conversion inkjet solution GQDa may further include MMA (methyl-metha-acrylate) and/or PMMA (Poly-memethyl-metha-acrylate). The second color conversion inkjet solution GQDa may further include a solvent for an inkjet process. The solvent may be hydrophilic.

Here, by the hydrophobic layer 120 on the partitioning wall pattern 110, the hydrophilic second color conversion inkjet solution GQDa does not deviate from the green pixel area GPX (overflow is prevented and/or blocked), and is provided only in the green pixel area GPX. Accordingly, the second color conversion inkjet solution GQDa may be sufficiently provided.

Here, the first fluorine layer RFL on the first color conversion pattern on the RQD is also hydrophobic, so that the first fluorine layer RFL as well as the hydrophobic layer 120 on the partitioning wall pattern 110 may also act as a barrier to prevent and/or block overflow of the second color conversion inkjet solution GQDa. Thus, the second color conversion inkjet solution GQDa may be prevented and/or blocked from overflowing to the red pixel region RPX by the partitioning wall pattern 110, the hydrophobic layer 120, and the first fluorine layer RFL.

In addition, since the first color conversion inkjet solution (see RQDa in FIG. 8E) is sufficiently provided, the first fluorine layer RFL may be formed to have a convex shape on its upper surface and be formed with a height H higher than an upper surface of the hydrophobic layer 120. Accordingly, overflow of the second color conversion inkjet solution GQDa may be prevented and/or blocked more efficiently.

Thus, even if a width W of the upper surface of the partitioning wall pattern 110 is narrower than the general case, the overflow of the inkjet solution can be easily controlled, and an aperture ratio of the display apparatus can be improved while using the inkjet process.

Figure 8H:
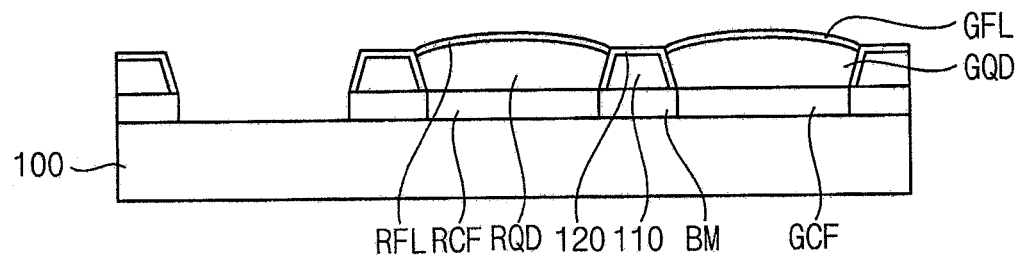
Figure 81:
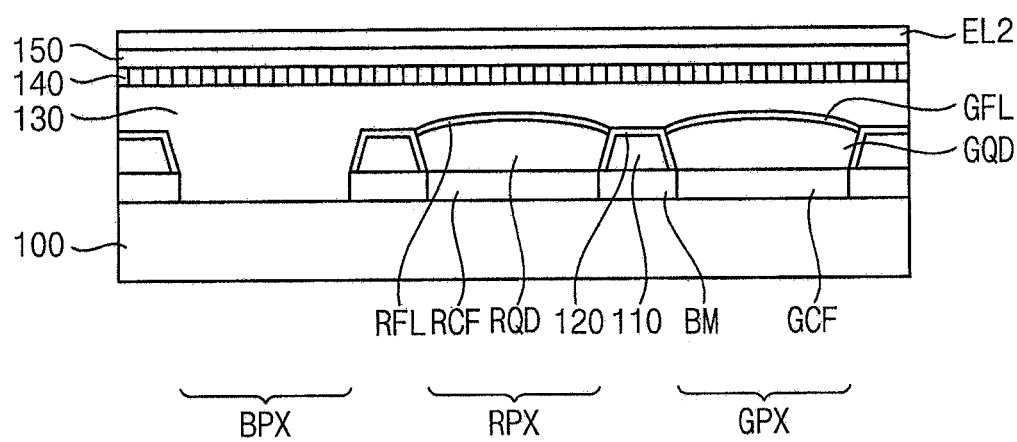

Referring to FIG. 8H, the second color conversion inkjet solution GQDa may be cured by heating the second color conversion inkjet solution GQDa. Accordingly, the second color conversion pattern GQD may be formed. Here, a second fluorine layer GFL may be formed on the second color conversion pattern GQD due to a self-stratification of fluorine surfactant component of the second color conversion inkjet solution GQDa. The second fluorine layer GFL may include fluorine and/or fluoropolymer.

Referring to FIG. 8I, a transparent layer 130 may be formed on the first base substrate 100 of which the first color conversion pattern RQD and the second color conversion pattern GQD are formed. The transparent layer 130 may be formed corresponding to the entire first base substrate 100 to cover all of the partitioning wall pattern 110, the first fluorine layer RFL, and the second fluorine layer GFL. The transparent layer 130 may include scattering particles that change the traveling direction of light passing therethrough without changing color. An upper surface of the transparent layer 130 may be flat for the following processes.

Thereafter, a wire grid polarizer 140 may be formed on the transparent layer 130. The wire grid polarizer 140 may be formed by forming a metal layer on the transparent layer 130 and then patterning the metal layer by imprint lithography or the like.

Thereafter, an insulation layer 150 may be formed on the wire grid polarizer 140. The insulation layer 150 may include an inorganic or organic insulating material. Depending on the material of the insulation layer 150, the insulation layer 150 may be obtained by a spin coating process, a chemical vapor deposition process, a plasma enhanced chemical vapor deposition process, a high density plasma-chemical vapor deposition process, or the like.

And then, a second electrode EL1 may be formed on the insulation layer 150.

Figure 8J:
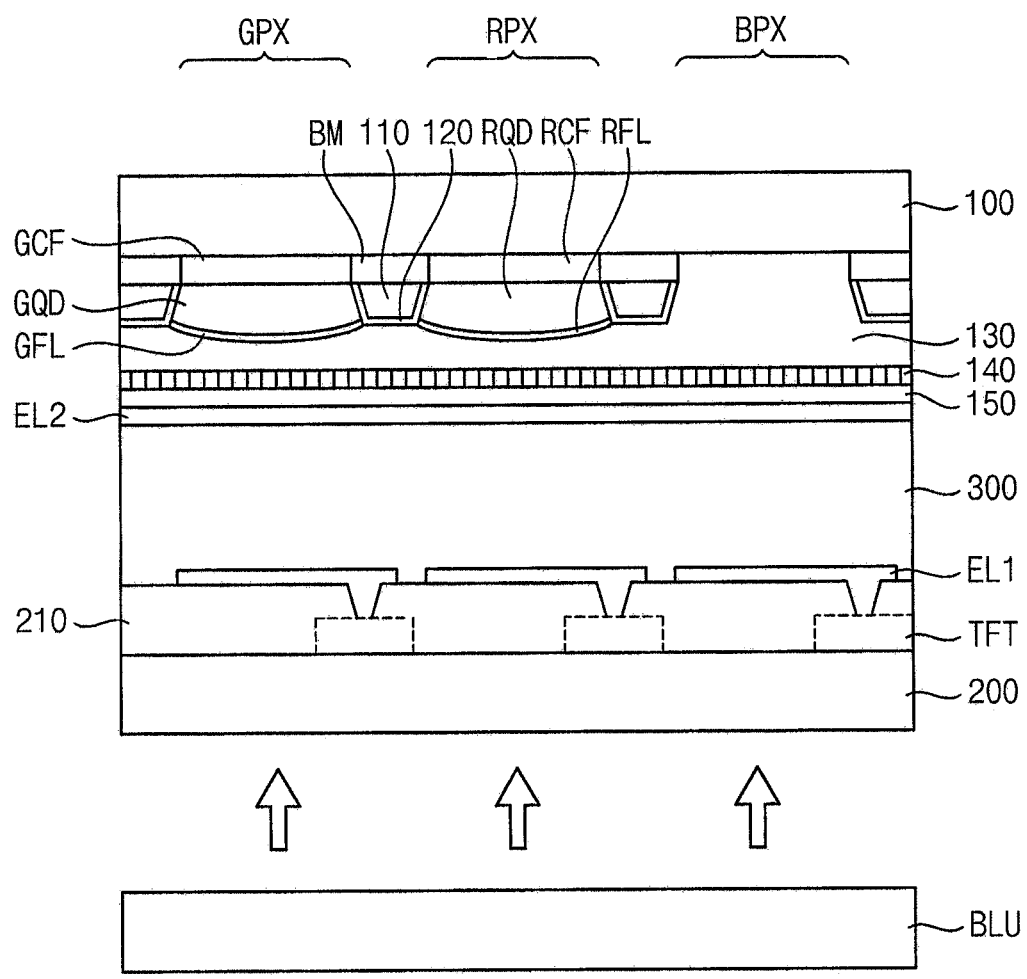

Referring to FIG. 8J, a thin film transistor TFT may be formed on a second base substrate 200. A TFT insulating layer 210 may be formed on the second base substrate 200 on which the thin film transistor TFT is formed. A first electrode EL1 may be formed on the TFT insulating layer 210. The thin film transistor TFT, the TFT insulating layer 210, and the first electrode EL1 may be formed by a related art method of forming a TFT substrate of a general display apparatus.

After a liquid crystal layer 300 is formed between the first electrode EL1 and the second electrode EL2, a backlight unit BLU may be prepared to manufacture the display apparatus. The liquid crystal layer 300 and the backlight unit BLU may be manufactured by a related art method.

Figure 9A:
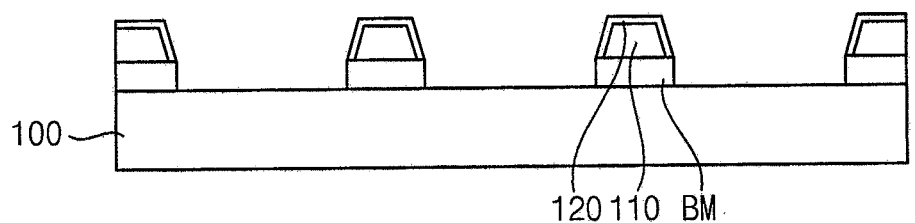
FIGS. 9A and 9B are cross-sectional views illustrating another method of manufacturing the display apparatus of FIG. 2.
Figure 9B:
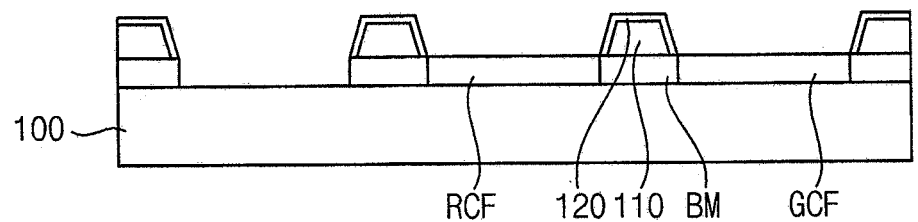

FIGS. 9A and 9B are cross-sectional views illustrating another method of manufacturing the display apparatus of FIG. 2. The method may be substantially the same as the method of FIGS. 8A to 8J, except for the order of forming a partitioning wall pattern 110, a hydrophobic layer 120, a first color filter RCF, and a second color filter BCF. Therefore, repeated description will be omitted.

Referring to FIG. 9A, a light blocking pattern BM may be formed on a first base substrate 100. A partitioning wall pattern 110 may be formed on the light blocking pattern BM. A hydrophobic layer 120 may be formed on a surface of the partitioning wall pattern 110.

Referring to FIG. 9B, a first color filter RCF and a second color filter GCF may be formed on the base substrate 100 on which the hydrophobic layer 120 is formed. Since the partitioning wall pattern 110 and the hydrophobic layer 120 have already been formed, the first color filter RCF and the second color filter GCF may be formed by an inkjet process using the partitioning wall pattern 110 and the hydrophobic layer 120. At this time, the first color filter RCF and the second color filter RCF may be easily formed using a hydrophilic inkjet solution similar to the case of the color conversion pattern. (refers to FIG. 8E, etc.)

Thereafter, the display apparatus may be manufactured using the same method as described in FIGS. 8E to 8J.

FIGS. 10A to 10H are cross-sectional views illustrating a method of manufacturing the display apparatus of FIG. 3. The method may be substantially the same as the method of FIGS. 8A to 8J, except that a partitioning wall pattern is not formed separately and a light blocking pattern BM works as a partitioning wall pattern. Therefore, repeated description will be omitted.

Figure 10A:
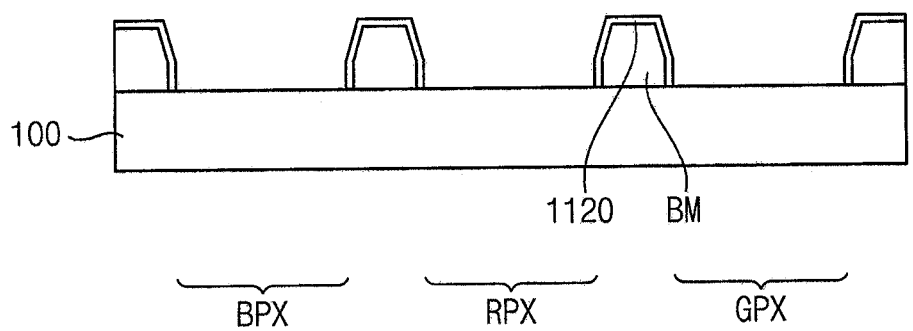
FIGS. 10A to 10H are cross-sectional views illustrating a method of manufacturing the display apparatus of FIG. 3.

Referring to FIG. 10A, a light blocking pattern BM may be formed on a first base substrate 100. The light blocking pattern BM may be formed by coating a photoresist material including a light blocking material on the first base substrate 100, exposing and developing the same. The light blocking pattern BM may define a red pixel area RPX, a green pixel area GPX and a blue pixel area BPX. And then, a hydrophobic layer 1120 can be formed on upper and side surfaces of the light blocking pattern BM by hydrophobic treatment of the surface of the light blocking pattern BM. For example, the hydrophobic layer 1120 may be formed by partially hydrophobizing the surfaces of the light blocking pattern BM through a plasma treatment or the like.

Figure 10B:
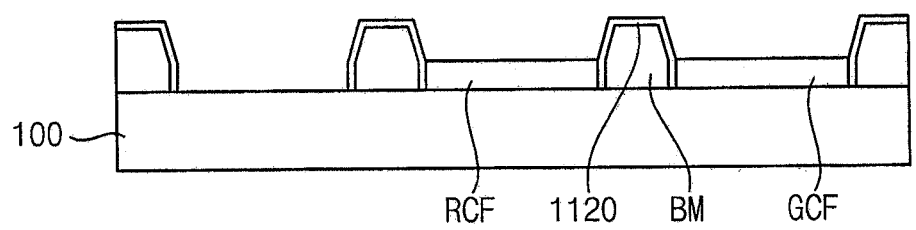

Referring to FIG. 10B, a first color filter RCF and a second color filter GCF may be formed on the first base substrate 100 on which the light blocking pattern BM and the hydrophobic layer 120 are formed. The first color filter RCF and the second color filter GCF may be formed using a photoresist method, an ink jet method, or the like. Preferably, the first color filter RCF and the second color filter GCF may be formed by the inkjet method using the light blocking pattern BM and the hydrophobic layer 120 that were already formed.

Figure 10C:
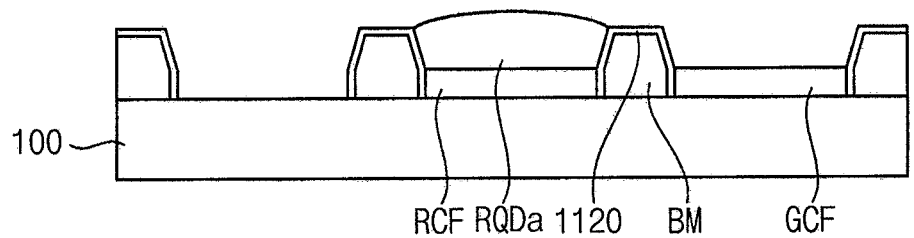
Figure 10D:
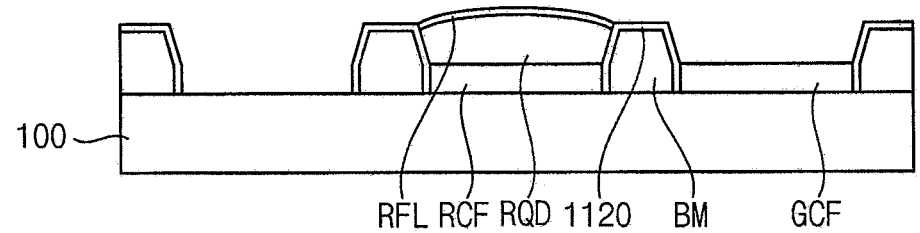

Referring to FIG. 10C, a first color conversion inkjet solution RQDa may be provided on the first color filter RCF in the red pixel RPX by an inkjet method Referring to FIG. 10D, the first color conversion inkjet solution RQDa may be cured by heating the first color conversion inkjet solution RQDa. Accordingly, the first color conversion pattern RQD may be formed. Here, a first fluorine layer RFL may be formed on the first color conversion pattern RQD due to a self-stratification of fluorine surfactant component of the first color conversion inkjet solution RQDa.

Figure 10E:
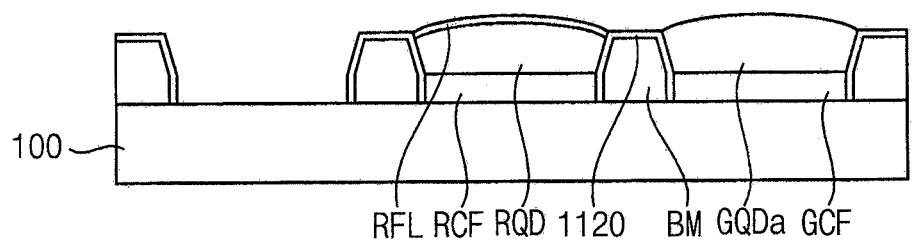

Referring to FIG. 10E, a second color conversion inkjet solution GQDa may be provided on the second color filter GCF in the green pixel area GPX using an inkjet method.

Figure 10F:
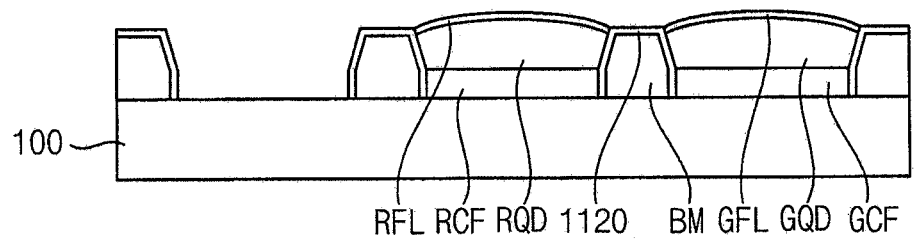

Referring to FIG. 10F, the second color conversion inkjet solution GQDa may be cured by heating the second color conversion inkjet solution GQDa. Accordingly, the second color conversion pattern GQD may be formed. Here, a second fluorine layer GFL may be formed on the second color conversion pattern GQD due to a self-stratification of fluorine surfactant component of the second color conversion inkjet solution GQDa.

Figure 10G:
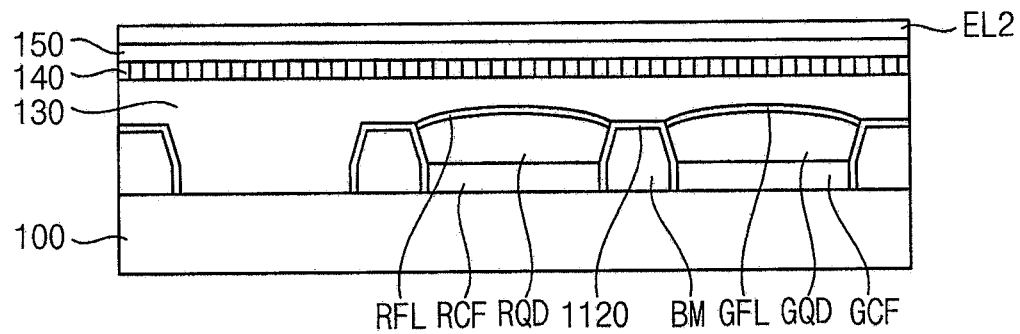

Referring to FIG. 10G, a transparent layer 130 may be formed on the first base substrate 100 of which the first color conversion pattern RQD and the second color conversion pattern GQD are formed. Thereafter, a wire grid polarizer 140 may be formed on the transparent layer 130. Thereafter, an insulation layer 150 may be formed on the wire grid polarizer 140. And then, a second electrode EL1 may be formed on the insulation layer 150.

Figure 10H:
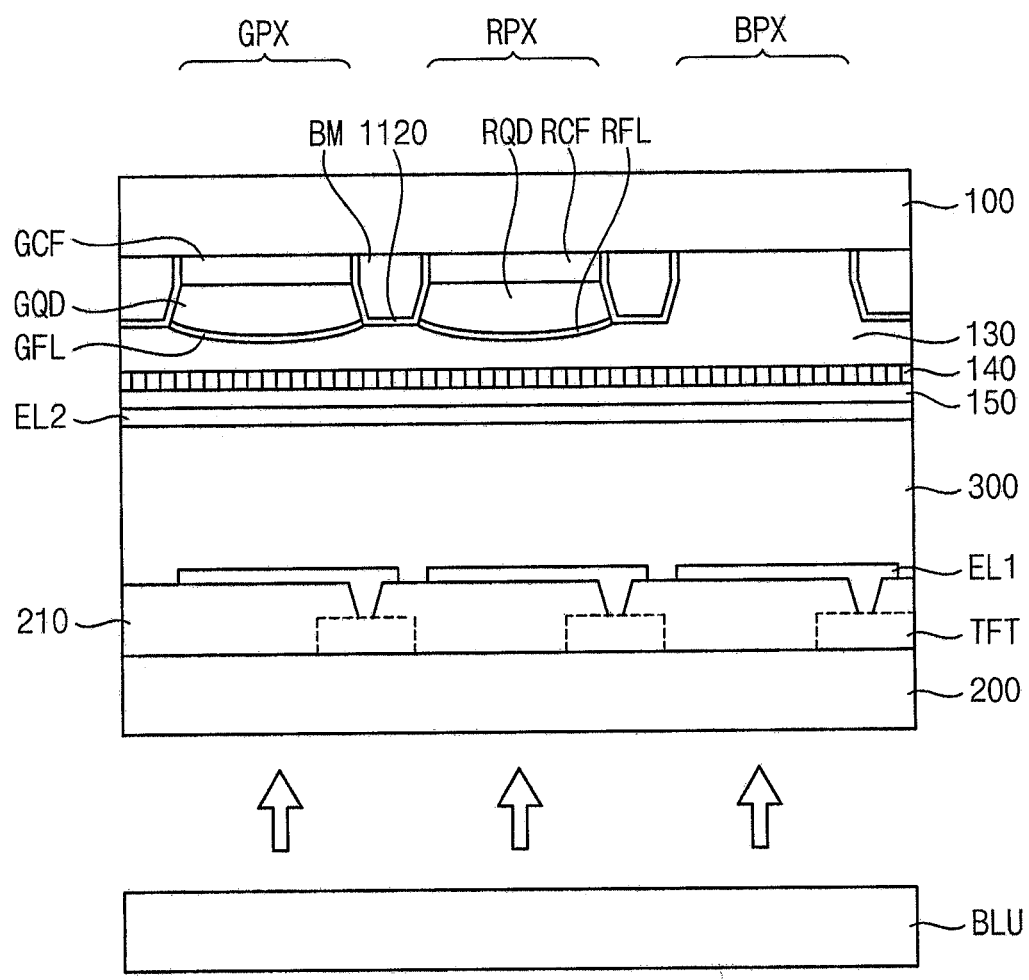

Referring to FIG. 10H, a thin film transistor TFT may be formed on a second base substrate 200. A TFT insulating layer 210 may be formed on the second base substrate 200 on which the thin film transistor TFT is formed. A first electrode EL1 may be formed on the TFT insulating layer 210. The thin film transistor TFT, the TFT insulating layer 210 and the first electrode EL1 may be formed by a related art method of forming a TFT substrate of a general display apparatus.

After a liquid crystal layer 300 is formed between the first electrode EU and the second electrode EL2, a backlight unit BLU may be prepared to manufacture the display apparatus. The liquid crystal layer 300 and the backlight unit BLU may be manufactured by a related art method.

FIGS. 11A to 11E are cross-sectional views illustrating a method of manufacturing the display apparatus of FIG. 4. The method may be substantially the same as the method of FIG. 8A to 8J or 9A and 9B, except for further forming a third color filter BCF, a third color conversion pattern BQD and a third fluorine layer BFL. Therefore, repeated description will be omitted.

Figure 11A:
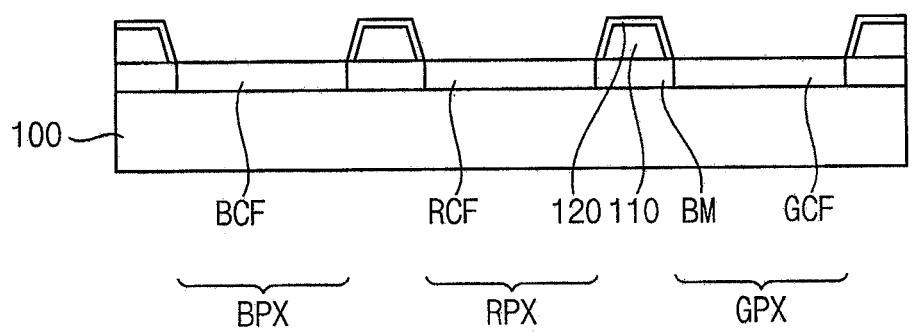
FIGS. 11A to 11E are cross-sectional views illustrating a method of manufacturing the display apparatus of FIG. 4.

Referring to FIG. 11A, a first color filter RCF, a second color filter GCF, a third color filter BCF, a partitioning wall pattern 110 and a hydrophobic layer 120 may be formed on a first base substrate 100.

The third color filter BCF may be formed in a manner similar to the first or second color filter RCF or GCF and may be formed before or after forming the partitioning wall pattern 110 and the hydrophobic layer 120.

Figure 11B:
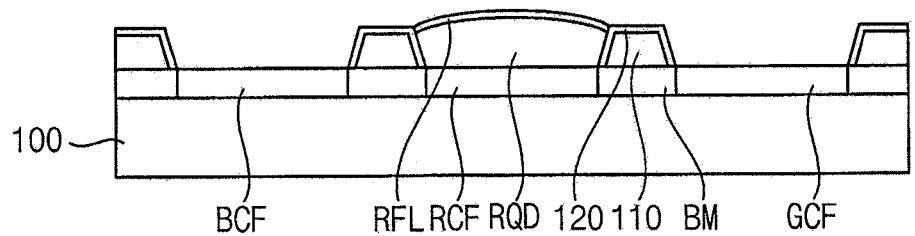

Referring to FIG. 11B, a first color conversion inkjet solution may be provided on the first color filter RCF in the red pixel RPX by an inkjet method. And then, the first color conversion inkjet solution may be cured by heating. A first fluorine layer RFL on the first color conversion pattern RQD and the first color conversion pattern RQD may be formed.

Figure 11C:
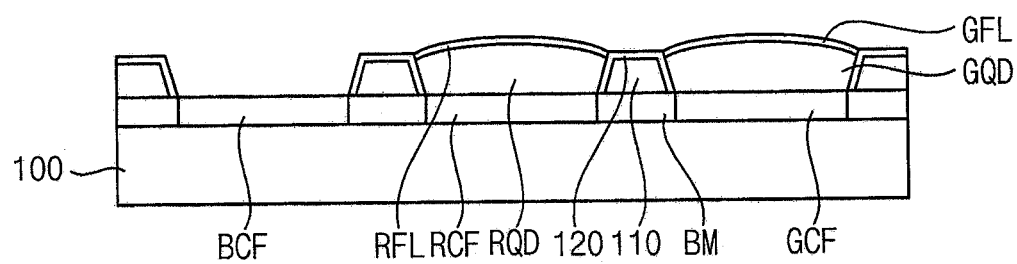

Referring to FIG. 11C, a second color conversion inkjet solution may be provided on the second color filter GCF in the green pixel RPX by an inkjet method. And then, the second color conversion inkjet solution may be cured by heating. A second fluorine layer GEL on the second color conversion pattern GQD and the second color conversion pattern GQD may be formed.

Figure 11D:
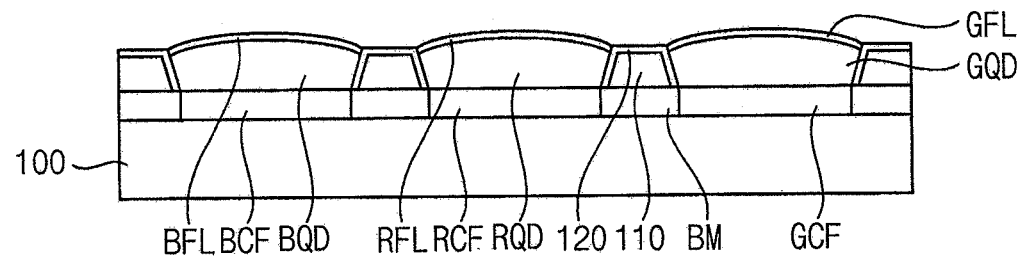

Referring to FIG. 11D, a third color conversion inkjet solution may be provided on the third color filter BCF in the blue pixel BPX by an inkjet method. And then, the third color conversion inkjet solution may be cured by heating. A third fluorine layer BFL on the third color conversion pattern BQD and the third color conversion pattern BQD may be formed.

Figure 11E:
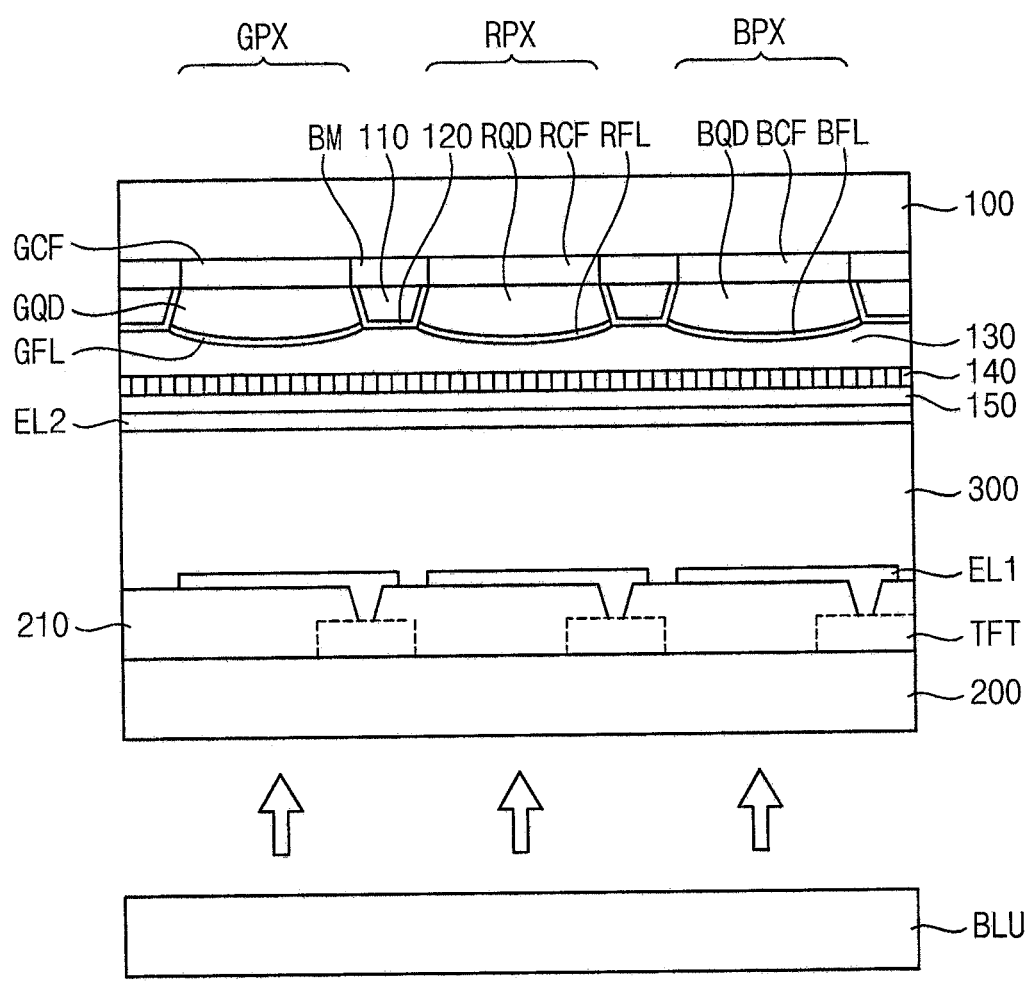

Referring to FIG. 11E, a transparent layer 130, a wire grid polarizer 140, an insulation layer 150, and a second electrode EL2 may be formed on the first base substrate 100. A thin film transistor TFT, a TFT insulation layer 210, and a first electrode LE1 may be formed on a second base substrate 200. After forming a liquid crystal layer 300 between the first electrode EL1 and the second electrode EL2, a backlight unit BLU may be arranged to thereby manufacture the display apparatus.

FIGS. 12A to 12E are cross-sectional views illustrating a method of manufacturing the display apparatus of FIG. 5. The method may be substantially the same as the method of FIG. 8A to 8J or 9A and 9B, except for forming a blue light blocking pattern Y instead of first and second color filters and forming a transparent pattern W disposed in a blue pixel region BPX. Therefore, repeated description will be omitted.

Figure 12A:
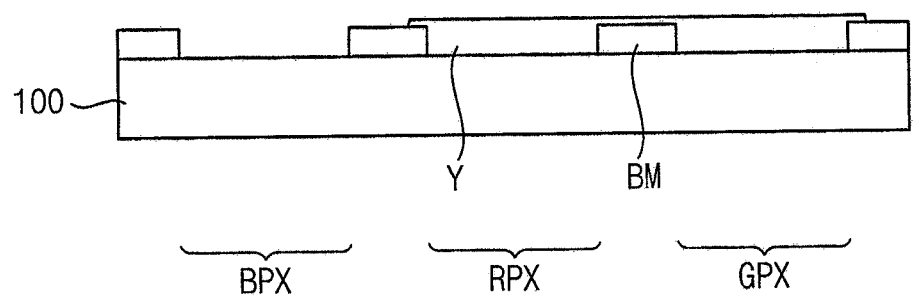
FIGS. 12A to 12E are cross-sectional views illustrating a method of manufacturing the display apparatus of FIG. 5.

Referring to FIG. 12A, a light blocking pattern BM may be formed on the first base substrate 100. A blue light blocking pattern Y may be formed in the red pixel area RPX and the green pixel region GPX on the first base substrate 100 on which the light blocking pattern BM is formed. The blue light blocking pattern Y may pass only light having a wavelength band excluding a blue wavelength band and may block light corresponding to the blue wavelength band.

Figure 12B:
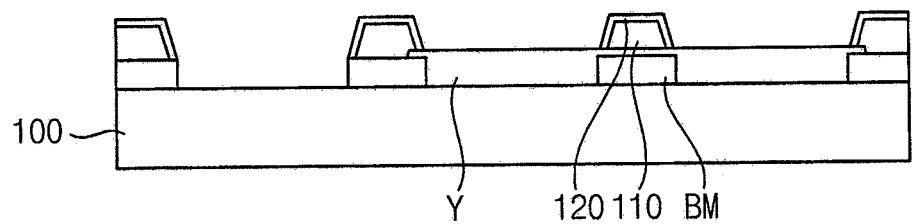

Referring to FIG. 12B, a partitioning wall pattern 110 may be formed on the blue light blocking pattern Y and the light blocking pattern BM. And then, a hydrophobic layer 120 may be formed through a surface treatment of the partitioning wall pattern 110.

Figure 12C:
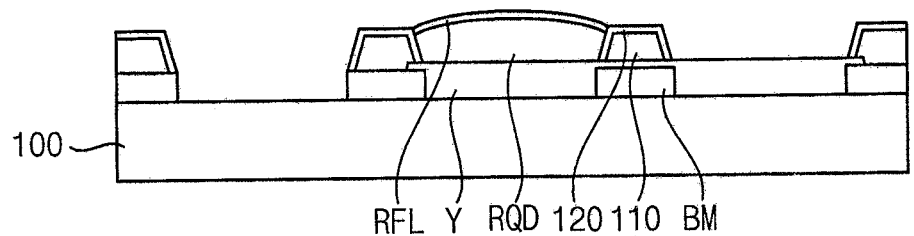

Referring to FIG. 12C, a first color conversion inkjet solution may be provided on the blue light blocking pattern Y in the red pixel area RPX using an inkjet method. And then, the first color conversion inkjet solution may be cured by heating. Accordingly, a first fluorine layer RFL on the first color conversion pattern RQD and the first color conversion pattern RQD may be formed.

Figure 12D:
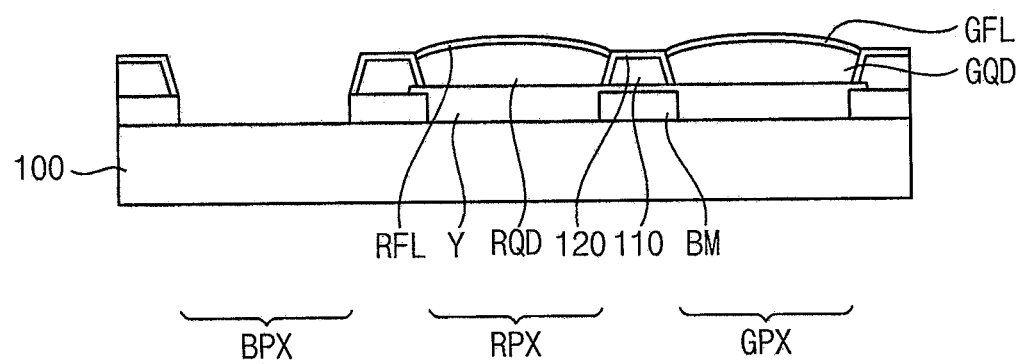

Referring to FIG. 12D, a second color conversion inkjet solution may be provide on the blue light blocking pattern Y in the green pixel area GPX by an inkjet method. And then, the second color conversion inkjet solution may be cured by heating. A second fluorine layer GFL on the second color conversion pattern GQD and the second color conversion pattern GQD may be formed.

Figure 12E:
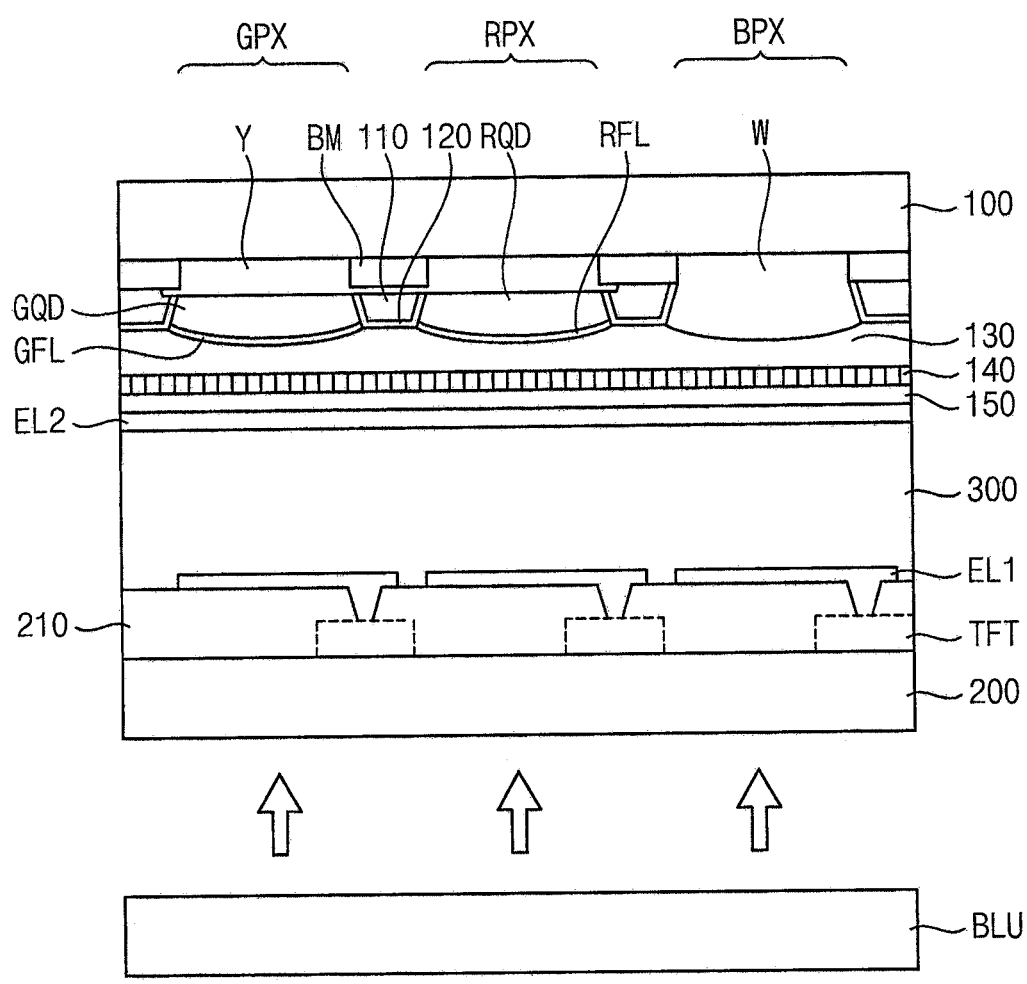

Referring to FIG. 12E, a transparent layer 130, a wire grid polarizer 140, an insulation layer 150 and a second electrode EL2 may be formed on the first base substrate 100. A thin film transistor TFT, a TFT insulation layer 210, and a first electrode LE1 may be formed on a second base substrate 200. After forming a liquid crystal layer 300 between the first electrode EL1 and the second electrode EL2, a backlight unit BLU may be prepared to manufacture the display apparatus.

Figure 13A:
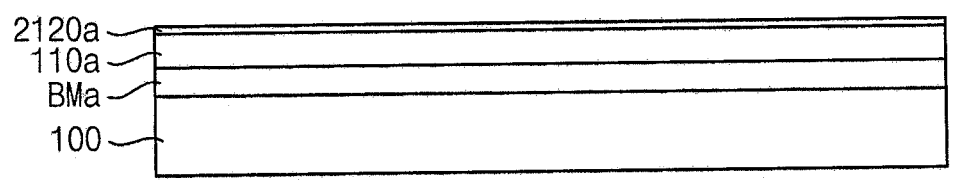
FIGS. 13A to 13C are cross-sectional views illustrating a method of manufacturing the display apparatus of FIG. 6.
Figure 13B:
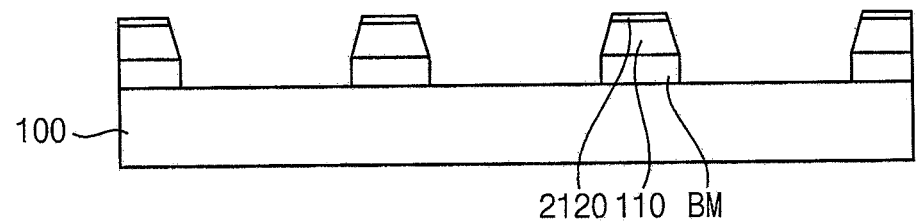
Figure 13C:
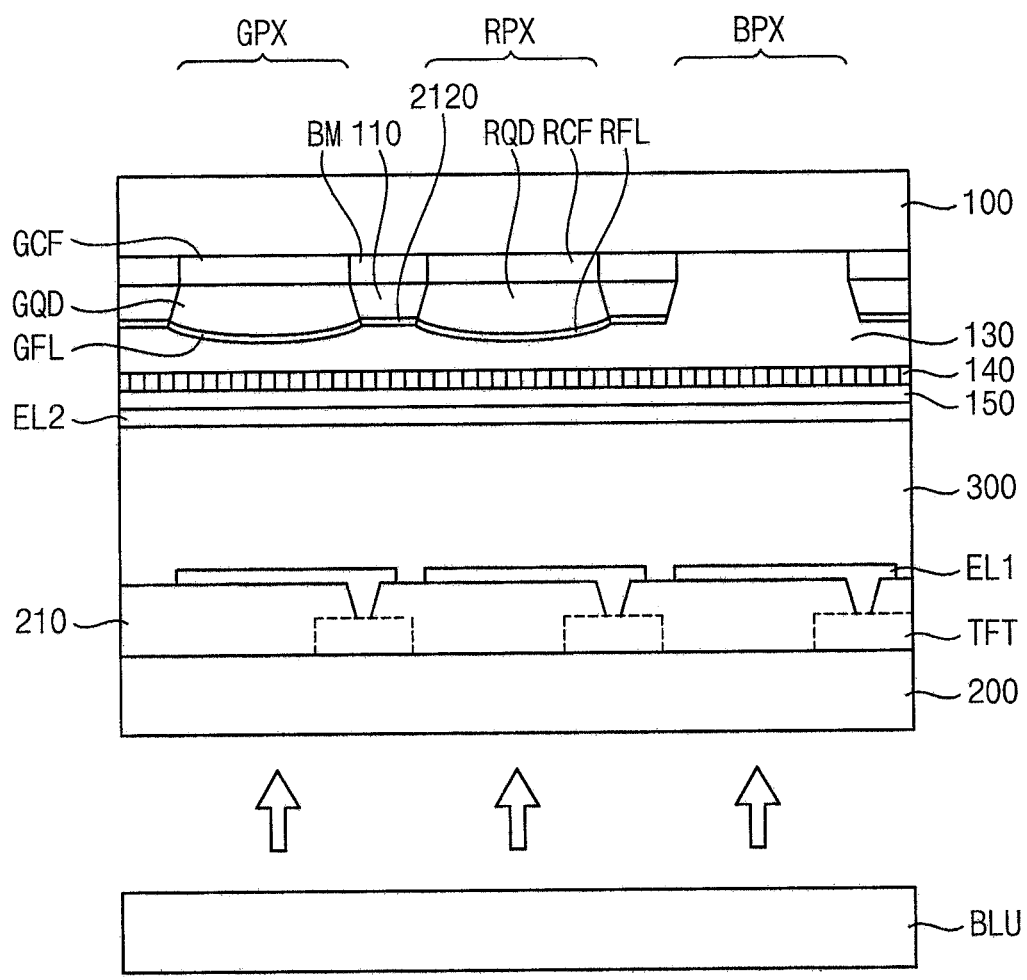

FIGS. 13A to 13C are cross-sectional views illustrating a method of manufacturing the display apparatus of FIG. 6. The method may be substantially the same as the method of FIGS. 8A to 8J, except that a light blocking pattern BM, a partitioning wall pattern 110, and a hydrophobic layer 2120 are patterned in one continuous process. Therefore, repeated description will be omitted.

Referring to FIG. 13A, a light blocking layer BMa including a light blocking material may be formed on a first base substrate 100. A partitioning wall layer 110a may be formed on the light blocking layer BMa. A preliminary hydrophobic layer 2120a may be formed on the partitioning wall layer 110a. The preliminary hydrophobic layer 2120a may be formed through a surface treatment of the partitioning wall layer 110a.

Referring to FIG. 13B, the preliminary hydrophobic layer 2120a, the partitioning wall layer 110a, and the light blocking layer BMa may be patterned to form a light blocking pattern BM on the first base substrate 100, a partitioning wall pattern 110 on the light blocking pattern BM, and a hydrophobic layer 2120 on the partitioning wall pattern 110.

Referring to FIG. 13C, a first color filter RCF, a second color filter GCF, a first color conversion pattern RQD, a first fluorine layer RFL, a second color conversion layer GQD, a second fluorine layer GFL, a transparent layer 130, a wire grid polarizer 140, an insulation layer 150, and a second electrode EL2 may be formed on the first base substrate 100. A thin film transistor TFT, a TFT insulation layer 210, and a first electrode EU may be formed on a second base substrate 200. After forming a liquid crystal layer 300 between the first electrode EL1 and the second electrode EL2, a backlight unit BLU may be prepared to manufacture the display apparatus.

FIGS. 14A to 14E are cross-sectional views illustrating a method of manufacturing the display apparatus of FIG. 7. The method may be substantially the same as the method of FIGS. 8A to 8J, except that a fluorine layer does not form a separate layer and a color conversion layer includes a first portion and a second portion which includes fluorine. Therefore, repeated description will be omitted.

Figure 14A:
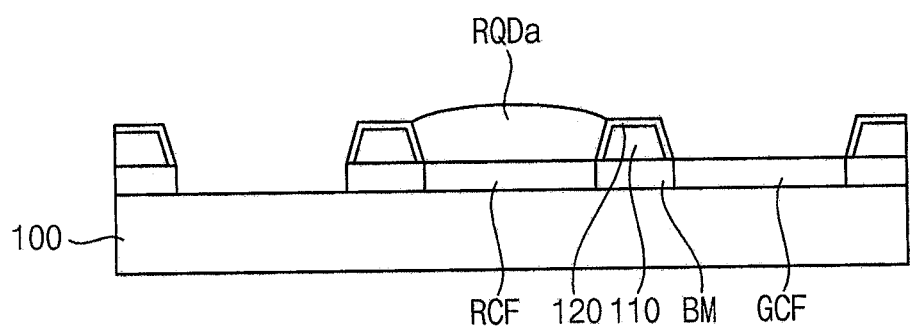
FIGS. 14A to 14E are cross-sectional views illustrating a method of manufacturing the display apparatus of FIG. 7.

Referring to FIG. 14A, a light blocking pattern BM, a first color filter RCF, a second color filter GCF, a partitioning wall pattern 110, and a hydrophobic layer 120 may be formed on the first base substrate 100.

And then, first color conversion inkjet solution RQDa may be provided on the first color filter RCF in the red pixel area RPX using an inkjet method.

Figure 14B:
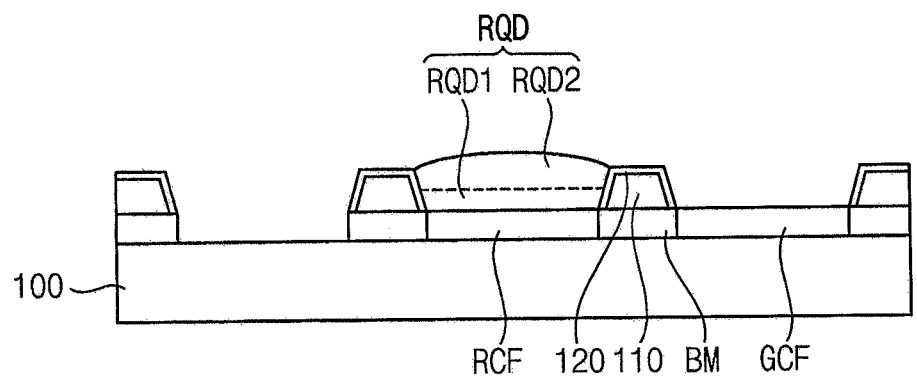

Referring to FIG. 14B, the first color conversion inkjet solution RQDa may be cured by heating. Accordingly, a first color conversion pattern RQD including a first portion RQD1 and a second portion RQD2 on the first portion RQD1 may be formed. A boundary of the first portion RQD1 and the second portion RQD2 may be unclear. Here, a content of fluorine and/or fluoropolymer in the second portion RQD2 is larger than that in the first portion RQD2.

Figure 14C:
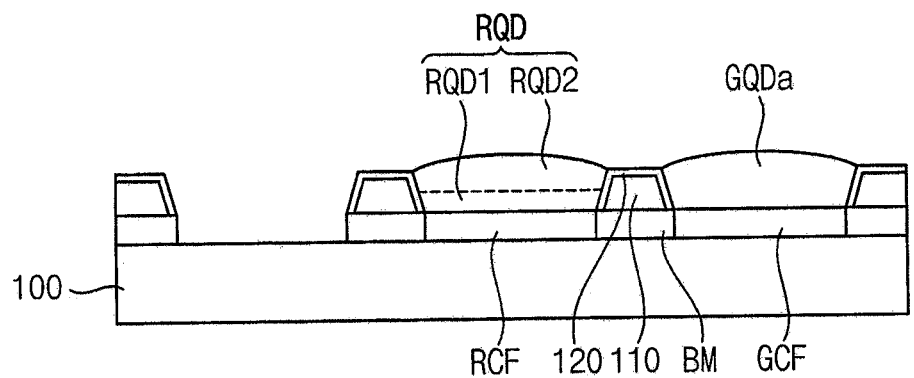

Referring to FIG. 14C, a second color conversion inkjet solution GQDa may be provided on the second color filter GCF in the green pixel area GPX using an inkjet method.

Figure 14D:
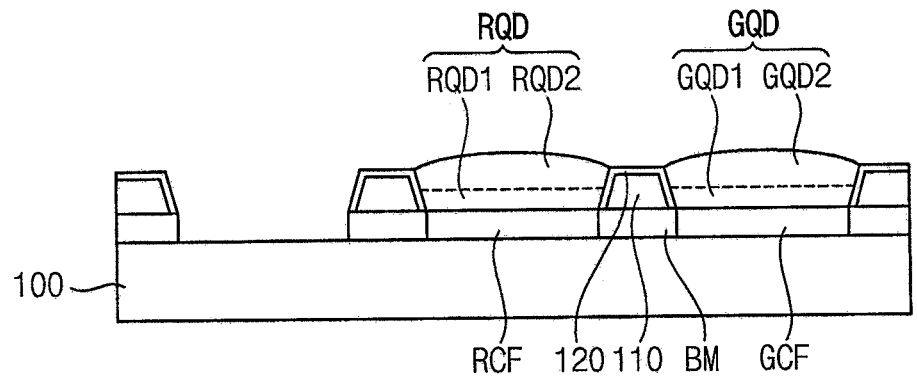

Referring to FIG. 14D, the second color conversion inkjet solution GQDa may be cured by heating. Accordingly, a second color conversion pattern GQD including a first portion GQD1 and a second portion GQD2 on the first portion GQD1 may be formed. A boundary of the first portion GQD1 and the second portion GQD2 may be unclear. Here, a content of fluorine and/or fluoropolymer in the second portion GQD2 is larger than that in the first portion GQD2.

Figure 14E:
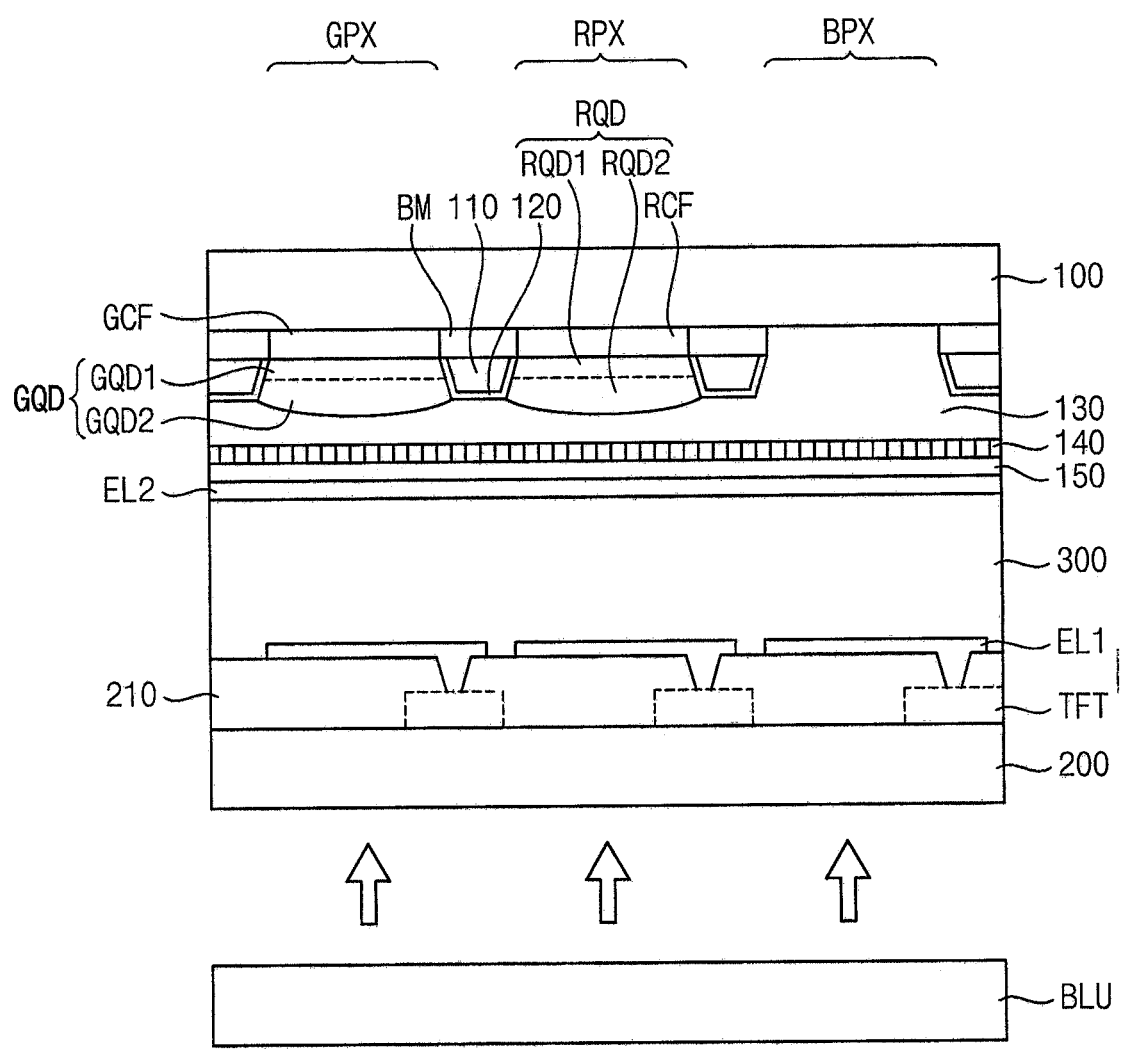

Referring to FIG. 14E, a transparent layer 130, a wire grid polarizer 140, an insulation layer 150, and a second electrode EL2 may be formed on the first base substrate 100. A thin film transistor TFT, a TFT insulation layer 210 and a first electrode EL1 may be formed on a second base substrate 200. After forming a liquid crystal layer 300 between the first electrode EL1 and the second electrode EL2, a backlight unit BLU may be prepared to manufacture the display apparatus.

According to the present inventive concept, a display apparatus includes a first base substrate, a partitioning wall pattern, a first color conversion pattern, a first fluorine layer on the first color conversion pattern, and a second fluorine layer on the second color conversion pattern. The first fluorine layer and the second fluorine layer are low refractive index layers compared to the first color conversion pattern and the second color conversion pattern and may work as the optical recycling filter, and there is no need to form an additional optical recycling filter.

In addition, a method of manufacturing a display apparatus includes providing a first color conversion inkjet solution, forming a first color conversion pattern and a first fluorine layer on the first color conversion pattern by curing the first color conversion inkjet solution, providing a second color conversion inkjet solution, and forming a second color conversion pattern by curing the second color conversion inkjet solution. Here, by the hydrophobic layer on the partitioning wall pattern, the second color conversion inkjet solution does not deviate from corresponding pixel area (overflow is prevented and/or blocked), and is provided only in the corresponding pixel area. Accordingly, the second color conversion inkjet solution may be sufficiently provided.

In addition, the first fluorine layer is also hydrophobic, so that the first fluorine layer as well as the hydrophobic layer on the partitioning wall pattern may also act as a barrier to prevent and/or block overflow of the second color conversion inkjet solution.

In addition, since the first color conversion inkjet solution is sufficiently provided, the first fluorine layer may be formed to have a convex shape on its upper surface and be formed with a height higher than an upper surface of the hydrophobic layer. Accordingly, overflow of the second color conversion inkjet solution may be prevented and/or blocked more efficiently. Thus, even if a width of the upper surface of the partitioning wall pattern is narrower than the general case, the overflow of the inkjet solution can be easily controlled, and an aperture ratio of the display apparatus can be improved while using the inkjet process.

The use of "may" when describing embodiments of the present invention refers to "one or more embodiments of the present invention." It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present. As used herein, the terms "use," "using," and "used" may be considered synonymous with the terms "utilize," "utilizing," and "utilized," respectively.

The foregoing is illustrative of the inventive concept and is not to be construed as limiting thereof. Although a few example embodiments of the inventive concept have been described, those skilled in the art will readily appreciate that many modifications are possible in the example embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific example embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A display apparatus, comprising:
a first base substrate;
a partitioning wall pattern between a first pixel area and a second pixel area and on the first base substrate;
a first color conversion pattern in the first pixel area and comprising quantum dot particles and/or phosphor;
a first fluorine layer on the first color conversion pattern, a fluorine content of the first fluorine layer being higher than that of the first color conversion pattern; and
a second color conversion pattern in the second pixel area and comprising quantum dot particles and/or phosphor,
an upper surface of the first fluorine layer having a convex shape with respect to the first base substrate.

2. The display apparatus of claim 1, further comprising:
a hydrophobic layer on the partitioning wall pattern.

3. The display apparatus of claim 1, further comprising:
a light blocking pattern overlapping with the partitioning wall pattern and comprising a light blocking material.

4. The display apparatus of claim 1, further comprising:
a second fluorine layer on the second color conversion pattern, a fluorine content of the second fluorine layer being higher than that of the second color conversion pattern,
wherein a refractive index of the first fluorine layer is lower than that of the first color conversion pattern, and
a refractive index of the second fluorine layer is lower than that of the second color conversion pattern.

5. The display apparatus of claim 4, further comprising:
a third pixel area spaced apart from the first and second pixel areas;
a transparent layer in the first pixel area, the second pixel area, and the third pixel area to cover the first fluorine layer and the second fluorine layer;
a second base substrate facing the first base substrate;
a thin film transistor on the second base substrate;
a liquid crystal layer between the first base substrate and the second base substrate; and
a backlight unit for emitting a blue light,
wherein the first color conversion pattern comprises red quantum dot particles and/or red phosphor, and the second color conversion pattern comprises green quantum dot particles and/or green phosphor.

6. The display apparatus of claim 5, further comprising:
a wire grid polarizer on the transparent layer; and
an insulation layer on the wire grid polarizer.

7. The display apparatus of claim 6, further comprising:
a first color filter between the first color conversion pattern and the first base substrate; and
a second color filter between the second color conversion pattern and the first base substrate.

8. The display apparatus of claim 1, wherein the first color conversion pattern further comprises epoxy and/or epoxyacrylate, and
the first fluorine layer comprises fluorine and/or fluoropolymer.

9. The display apparatus of claim 1, wherein the first color conversion pattern and the first fluorine layer are in one layer whose boundary is unclear, the one layer having a first portion that is closer to the first base substrate and a second portion that is further from the first base substrate, and
a content of fluorine and/or fluoropolymer in the second portion is larger than that in the first portion.

10. A display apparatus, comprising:
a first base substrate;
a partitioning wall pattern between a first pixel area and a second pixel area and on the first base substrate;

a first color conversion pattern in the first pixel area and comprising quantum dot particles and/or phosphor;
a first fluorine layer on the first color conversion pattern, a fluorine content of the first fluorine layer being higher than that of the first color conversion pattern;
a second color conversion pattern in the second pixel area and comprising quantum dot particles and/or phosphor; and
a hydrophobic layer on the partitioning wall pattern,
wherein an upper surface of the first fluorine layer is higher than an upper surface of the hydrophobic layer on the partitioning wall pattern,
the upper surface of the first fluorine layer is a surface of the first fluorine layer which is facing away from the first base substrate, and
the upper surface of the hydrophobic layer is a surface of the hydrophobic layer which is facing away from the first base substrate.

11. A method of manufacturing a display apparatus, the method comprising:
forming a partitioning wall pattern on a first base substrate between a first pixel area and a second pixel area;
providing a first color conversion inkjet solution comprising quantum dot particles and/or phosphor, a solvent, and a fluorine surfactant;
forming a first color conversion pattern and a first fluorine layer on the first color conversion pattern by curing the first color conversion inkjet solution, an upper surface of the first fluorine layer having a convex shape with respect to the first base substrate;
providing a second color conversion inkjet solution comprising quantum dot particles and/or phosphor in the second pixel area on the first base substrate on which the first fluorine layer is formed; and
forming a second color conversion pattern by curing the second color conversion inkjet solution.

12. The method of claim 11, wherein the first color conversion pattern comprises red quantum dot particles and/or red phosphor, and epoxy and/or epoxy-acrylate, and the second color conversion pattern comprises green quantum dot particles and/or green phosphor.

13. The method of claim 12, further comprising:
before providing the first color conversion inkjet solution, forming a hydrophobic layer on the partitioning wall pattern.

14. The method of claim 13, wherein a height of the upper surface of the first fluorine layer is higher than an upper surface of the hydrophobic layer from the first base substrate.

15. The method of claim 13, wherein the method further comprises forming a light blocking pattern on the first base substrate, or wherein the partitioning wall pattern comprises a light blocking material.

16. The method of claim 13, further comprising:
before providing the first color conversion inkjet solution, forming a first color filter by an inkjet method in the first pixel area and forming a second color filter in the second pixel area.

17. The method of claim 11, wherein in providing the second color conversion inkjet solution, the second color conversion inkjet solution comprises a solvent and a fluorine surfactant, and
wherein in forming the second color conversion pattern, the second color conversion pattern and a second fluorine layer on the second color conversion pattern are formed by curing the second color conversion inkjet solution, and
wherein a refractive index of the first fluorine layer is lower than that of the first color conversion pattern, and
a refractive index of the second fluorine layer is lower than that of the second color conversion pattern.

18. The method of claim 11, wherein the forming of the partitioning wall pattern comprises:
forming a partitioning wall layer on the first base substrate;
forming a preliminary hydrophobic layer on the partitioning wall layer; and
forming the partitioning wall pattern and a hydrophobic layer on the partitioning wall pattern by patterning the preliminary hydrophobic layer and the partitioning wall layer.

19. The method of claim 11, further comprising:
before providing the first color conversion inkjet solution, forming a blue light blocking pattern on the first base substrate in the first pixel area and the second pixel area.

20. The method of claim 11, wherein the first color conversion pattern and the first fluorine layer are formed in one layer whose boundary is unclear, the one layer having a first portion that is closer to the first base substrate and a second portion that is further from the first base substrate, and
a content of fluorine and/or fluoropolymer in the second portion is larger than that in the first portion.

* * * * *

UNITED STATES PATENT AND TRADEMARK OFFICE
CERTIFICATE OF CORRECTION

PATENT NO. : 10,670,901 B2  
APPLICATION NO. : 15/997152  
DATED : June 2, 2020  
INVENTOR(S) : Boram Lee et al.

Page 1 of 1

It is certified that error appears in the above-identified patent and that said Letters Patent is hereby corrected as shown below:

In the Claims

Column 22, Line 8, Claim 1    delete "on" and insert -- directly on and covering --

Column 23, Line 26, Claim 11    delete "on" and insert -- directly on and covering --

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*